US005972250A

United States Patent [19]

Miyamoto et al.

[11] Patent Number: 5,972,250

[45] Date of Patent: Oct. 26, 1999

[54] APPARATUS FOR FABRICATING AN OPTICAL INFORMATION MEDIUM

[75] Inventors: Hisaki Miyamoto, Suita; Michiyoshi Nagashima, Ikoma; Kiyoshi Inoue, Osaka; Sakae Noda, Katano, all of Japan

[73] Assignee: Matsushita Electric Industrial Co., Ltd., Osaka, Japan

[21] Appl. No.: 08/861,943

[22] Filed: May 22, 1997

Related U.S. Application Data

[62] Division of application No. 08/599,181, Feb. 9, 1996, Pat. No. 5,681,634.

[30] Foreign Application Priority Data

| | | | |
|---|---|---|---|
| Feb. 15, 1995 | [JP] | Japan | 7-027086 |
| Mar. 17, 1995 | [JP] | Japan | 7-058933 |
| Mar. 17, 1995 | [JP] | Japan | 7-058934 |

[51] Int. Cl.[6] .................. B29D 11/00

[52] U.S. Cl. .................. 264/1.7; 264/1.33; 264/1.34; 264/1.36; 264/2.4; 264/446; 264/471; 264/634; 264/642; 430/495; 430/945; 430/271; 430/394; 427/504

[58] Field of Search .................. 430/495, 945, 430/271, 270, 273, 394, 904; 156/580.1, 582; 427/372.2, 504, 571, 271; 264/1.36, 1.34, 1.7, 2.1, 2.3, 2.4, 2.5, 2.7, 405, 241, 580.1, 442, 446, 471, 634, 642, 173.11

[56] References Cited

U.S. PATENT DOCUMENTS

| | | | |
|---|---|---|---|
| 4,670,077 | 6/1987 | Peeters | 156/245 |
| 5,023,167 | 6/1991 | Kalyanaraman et al. | 430/495 |
| 5,296,340 | 3/1994 | Tsukada et al. | 430/394 |
| 5,470,691 | 11/1995 | Arai et al. | 430/273 |
| 5,549,952 | 8/1996 | Arai et al. | 428/64.4 |
| 5,705,247 | 1/1998 | Arai et al. | 428/64.1 |

FOREIGN PATENT DOCUMENTS

| | | |
|---|---|---|
| 63-119040 | 5/1988 | Japan . |
| 3209640 | 9/1991 | Japan . |
| 351782 | 11/1991 | Japan . |
| 4-271031 | 9/1992 | Japan . |
| 6274940 | 9/1994 | Japan . |
| 750035 | 2/1995 | Japan . |
| 706178 | 4/1996 | Japan . |

OTHER PUBLICATIONS

Korean Patent Office Action in corresponding Korean Application No. 96–3660, dated Oct. 28, 1998 (4 pp.).

*Primary Examiner*—Merrick Dixon
*Attorney, Agent, or Firm*—Renner, Otto, Boisselle & Sklar

[57] ABSTRACT

The disk-shaped optical information medium of this invention includes: a first substrate having a center hole; a second substrate having a center hole; and a radiation curable resin interposed between the first and second substrates for bonding together the first and second substrates, wherein the optical information medium further includes a stopper for preventing the radiation curable resin from protruding into the center holes of the substrates, and a space between the first and second substrates of at least a half of a clamp region for clamping the optical information medium is filled with the resin.

8 Claims, 17 Drawing Sheets

35

4

7

1

37

112
113
111
114

12
15
13a
13
14
11

12
15
13b
13
14
11

21
20
19
18
$\phi a$
$\phi b$
4
1
7

APPARATUS FOR FABRICATING AN OPTICAL INFORMATION MEDIUM

This is a division of application Ser. No. 08/599,181, filed Feb. 9, 1996, now U.S. Pat. No. 5,681,634.

BACKGROUND OF THE INVENTION

1. Field of the Invention

The present invention relates to an optical information medium where two optical information substrates are bonded together, and a method and an apparatus for fabricating the same.

2. Description of the Related Art

In order to enhance the density of an optical disk, reducing the wavelength of a reproduced laser beam and increasing the numerical aperture (NA) of an objective lens are required. However, increasing the NA of an objective lens makes the allowable tilt of a disk very small. For example, for a substrate with a thickness of 1.2 mm which is the thickness of CDs, the tilt of the substrate allowable for an objective lens with an NA of 0.6 is about 0.25°. This is equal to the error occurring at the mounting of an optical head to a player, meaning that no allowance is left for the tilt of an optical disk due to a shape change of the disk. Such an optical disk is not practical.

The allowable range for the tilt of a disk can be widened by reducing the thickness of a substrate. Thus, a practical optical disk with high density used for an objective lens with high NA can be realized. For example, by reducing the thickness of the substrate to 0.6 mm which is a half of the thickness of CDs, the tilt allowable for an objective lens with an NA of 0.6 is as high as about 0.75°. In this case, even if an error of 0.25° arises at the mounting of an optical head to a player, a tilt of the disk of 0.5° due to a shape change of the disk is allowed.

An optical disk composed of a single thin substrate tends to bend down by its own weight. To avoid this problem, it is recommended to bond two substrates together. This serves, not only to increase the mechanical strength, but also to double the capacity of the disk by using two sides for information recording.

FIG. 1 is a sectional view of a typical optical disk having two substrates bonded together with a radiation curable resin. Referring to FIG. 1, a first substrate 1 has a first information signal surface 2, on which a first reflection film 3 made of metal and the like including aluminum as a main component is formed. A second substrate 4 has a second information signal surface 5, on which a second reflection film 6 made of the same material as the first reflection film 3 is formed. A layer of a radiation curable resin 7 is formed between the first and second reflection films 3 and 6, which are facing each other, so as to bond the first and second substrates 1 and 4 together.

Referring to FIGS. 2A to 2D, a conventional method for fabricating such an optical disk will be described (Japanese Laid-Open Patent Publication No. 6-238846). The first substrate 1 having the first information signal surf ace 2 is formed with a transparent resin such as polycarbonate by injection molding and the like. The first reflection film 3 is then formed on the first information signal surface 2 of the first substrate 1 by sputtering, vapor deposition, and the like. Also, the second substrate 4 having the second information signal surface 5 is formed by injection molding and the like, and the second reflection film 6 is formed on the second information signal surface 5 of the second substrate 4 by sputtering and vapor deposition. The first and second reflection films 3 and 6 are made of metal including aluminum as a main component. Then, while the first substrate 1 being rotated at low speed, the radiation curable resin 7 is applied to the surface of the first substrate 1 on which the first reflection film 3 is formed, forming a donut-shaped resin layer (FIG. 2A). The second substrate 4 is then placed on the radiation curable resin 7 so that the second reflection film 6 on the second information signal surface 5 of the second substrate 4 faces the radiation curable resin 7 (FIG. 2B). The first and second substrates 1 and 4 are then rotated together at high speed to allow the radiation curable resin to spread in the space between the first and second substrates 1 and 4 (FIG. 2C). The radiation curable resin is irradiated with radioactive rays (UV rays in FIG. 2D) through the second substrate 4 and the second reflection film 6 formed thereon, to cure the radiation curable resin and thus to bond the two substrates integrally (FIG. 2D).

In this conventional example, each of the two bonded substrates has an information signal surface, and the reflection film is formed on each information signal surface. The reflection film allows a slight amount of radioactive rays to pass therethrough and thus causing the radiation curable resin to be cured. For example, when the reflection film is made of aluminum and irradiated with UV rays, the UV transmittance of the aluminum film is 1% or less, which is large enough to cure the resin sufficiently.

The disk with bonded thin substrates has such a large capacity that the capacity of only one side of the disk is enough for most software. Accordingly, one of the bonded substrates can be a transparent dummy substrate. In this case, the radiation curable resin can be rapidly and easily cured with radioactive rays passing through the transparent substrate (Japanese Laid-Open Patent Publication Nos. 5-63668 and 5-195011).

Alternatively, a semi-transparent film can be formed on one of the two substrates, and the two information signal surfaces can be accessed from one side of the disk. In this case, the radiation curable resin can be rapidly and easily cured with radioactive rays through the semi-transparent film.

As described above, in the above conventional method for fabricating a disk with two substrates bonded together, a radiation curable resin is applied to one of the substrates to form a donut-shaped resin layer while the substrate is being rotated at low speed, and the radiation curable resin is allowed to spread in a space between the two substrates while the two substrates are being rotated at high speed. In this case, when the high-speed rotation of the two substrates starts before the radiation curable resin spreads toward the inner circumferences of the substrates, the inner circumference portion of the disk is not supplied with a sufficient amount of resin. The resultant disk is inferior in strength. On the contrary, when the high-speed rotation of the two substrates starts only after the resin has sufficiently spread in the space between the two substrates, the resin tends to protrude to center holes of the substrates. This causes troubles such as decentering when the resultant disk is mounted on a turntable of a player.

SUMMARY OF THE INVENTION

The disk-shaped optical information medium of this invention includes: a first substrate having a center hole; a second substrate having a center hole; and a radiation curable resin interposed between the first and second substrates for bonding together the first and second substrates, wherein the optical information medium further includes a stopper for preventing the radiation curable resin from protruding into the center holes of the substrates, and a space between the first and second substrates of at least a half of a clamp region for clamping the optical information medium is filled with the resin.

In one embodiment of the invention, the stopper includes at least one concave portion formed on at least one of the first and second substrates.

In another embodiment of the invention, the concave portion is a ring-shaped groove which is substantially concentric with the center holes of the substrates.

In still another embodiment of the invention, the stopper includes at least one concave portion formed on one of the first and second substrates and at least one convex portion formed on the other substrate.

In still another embodiment of the invention, the concave portion is disposed to face the convex portion.

In still another embodiment of the invention, the stopper is formed at a position closer to the center holes of the substrates with respect to the center of the clamp region, and the radiation curable resin spreads to the position of the stopper.

In still another embodiment of the invention, the stopper is formed at a position farther from the center holes of the substrates with respect to the center of the clamp region, and another resin layer is formed on a portion of the substrates closer to the center holes with respect to the stopper.

In still another embodiment of the invention, the another resin layer includes a radiation curable resin having a viscosity higher than the radiation curable resin for bonding the first and second substrates together.

In still another embodiment of the invention, the stopper includes a sealant layer.

In still another embodiment of the invention, the sealant layer is formed by printing a radiation curable resin.

In still another embodiment of the invention, the sealant layer is made of a hot melt adhesive.

Alternatively, the disk-shaped optical information medium of this invention includes: a first substrate having a center hole; a second substrate having a center hole; and a radiation curable resin interposed between the first and second substrates for bonding together the first and second substrates, wherein the optical information medium further includes a ring-shaped groove substantially concentric with the center holes of the substrates, formed on at least one of the first and second substrates at a position closer to the center holes with respect to the center of a clamp region for clamping the optical information medium, and a space between the first and second substrates of at least a half of the clamp region is filled with the radiation curable resin.

In one embodiment of the invention, an information signal surface is formed on a portion of the at least one substrate closer to an outer circumference of the substrate with respect to an outer rim of the groove on the substrate, and a reflection film is formed on the groove and the information signal surface.

Alternatively, the optical information medium of this invention includes a first substrate having a center hole, a second substrate having a center hole, and a radiation curable resin interposed between the first and second substrates to integrate the first and second substrates, wherein the radiation curable resin does not exist in a region adjacent to the center holes of the first and second substrates.

Alternatively, the disk-shaped optical information medium of this invention includes: a first substrate having a center hole; a second substrate having a center hole; and a radiation curable resin interposed between the first and second substrates for bonding together the first and second substrates, wherein an outer circumference of at least one of the first and second substrates is tapered.

Alternatively, the disk-shaped optical information medium of this invention includes: a first substrate having a center hole; a second substrate having a center hole; and a radiation curable resin interposed between the first and second substrates for bonding together the first and second substrates, wherein the radiation curable resin has a weather-resistance pigment mixed therein.

Alternatively, the disk-shaped optical information medium of this invention includes: a first substrate having a center hole; a second substrate having a center hole; and a radiation curable resin interposed between the first and second substrates for bonding together the first and second substrates, wherein the radiation curable resin includes a resin of which color density varies with the level of the curing of the resin.

According to another aspect of this invention, a method for fabricating an optical information medium is provided. The method includes the steps of: forming a pair of substrates each having a center hole; placing one of the pair of substrates on the other substrate with a radiation curable resin interposed therebetween; and curing the radiation curable resin by irradiating the resin with radioactive rays capable of passing through at least one of the pair of substrates so as to bond the pair of substrates together, wherein the step of forming a pair of substrates includes the step of forming a stopper for preventing the radiation curable resin from protruding into the center holes on at least one of the pair of substrates, and the step of placing one of the pair of substrates on the other substrate includes the step of filling at least a half of a clamp region of the optical information medium with the radiation curable resin.

In one embodiment of the invention, the step of placing one of the pair of substrates on the other substrate includes the steps of: applying the radiation curable resin to a portion of the substrate on which the stopper is formed closer to an outer circumference of the substrate with respect to the stopper to form a donut-shaped resin layer while the substrate is being rotated, placing the other substrate on the substrate with the stopper, and rotating both substrates integrally; and curing the radiation curable resin by irradiating the radiation curable resin with radioactive rays passing through at least one of the substrates.

In another embodiment of the invention, the step of placing one of the pair of substrates on the other substrate includes the step of: mounting the pair of substrates on a rotational table having an outer diameter smaller than an outer diameter of at least one of the pair of substrates so as to rotate the pair of substrates.

In still another embodiment of the invention, the step of placing one of the pair of substrates on the other substrate includes the step of: mounting the pair of substrates on a rotational table having an outer diameter smaller than an outer diameter of at least one of the pair of substrates so as to rotate the pair of substrates, and absorbing the radiation curable resin through the center holes of the pair of substrates while the pair of substrates are being rotated.

In still another embodiment of the invention, in the step of curing the radiation curable resin, a transparent plate having an outer diameter smaller than an outer diameter of at least one of the pair of substrates is placed on the bonded pair of substrates and the radiation curable resin is irradiated with the radioactive rays passing through the transparent plate.

Alternatively, the method for fabricating an optical information medium of this invention includes the steps of: forming a pair of substrates each having a center hole; placing one of the pair of substrates on the other substrate with a radiation curable resin interposed therebetween; and curing the radiation curable resin with radioactive rays capable of passing through at least one of the pair of substrates so as to bond the pair of substrates together, wherein the step of placing one of the pair of substrates on the other substrate includes the step of disposing the radiation curable resin so that the resin is away from the center holes of the substrates.

In one embodiment of the invention, the step of forming a pair of substrates includes the step of forming a stopper for preventing the radiation curable resin from protruding into the center holes on at least one of the pair of substrates.

In another embodiment of the invention, the step of placing one of the pair of substrates on the other substrate includes the steps of: applying the radiation curable resin to a portion of the substrate on which the stopper is formed closer to an outer circumference of the substrate with respect to the stopper to form a donut-shaped resin layer while the substrate is being rotated, forming a layer of another radiation curable resin on a portion of the substrate closer to an inner circumference with respect to the stopper, placing the other substrate on the substrate with the stopper, and rotating the both substrates integrally; and curing the radiation curable resin by irradiating the radiation curable resin with radioactive rays passing through at least one of the pair of substrates.

In still another embodiment of the invention, in the step of curing the radiation curable resin, a transparent plate is placed on the bonded pair of substrates and the radiation curable resin is irradiated with the radioactive rays passing through the transparent plate.

In still another embodiment of the invention, the another radiation curable resin is applied by use of a roller.

Alternatively, the method for fabricating an optical information medium of this invention includes the steps of: forming a pair of substrates each having a center hole; placing one of the pair of substrates on the other substrate with a radiation curable resin interposed therebetween; and curing the radiation curable resin with radioactive rays capable of passing through at least one of the pair of substrates so as to bond the pair of substrates, wherein, in the step of forming a pair of substrates, an outer circumference of at least one of the pair of substrates is tapered.

In one embodiment, the step of placing one of the pair of substrates on the other substrate includes the step of: shaping the radiation curable resin at outer circumferences of the pair of substrates by use of a transfer roller having a shape corresponding to a shape of a recess formed by the tapered outer circumferences of the pair of substrates.

In another embodiment of the invention, the step of placing one of the pair of substrates on the other substrate includes the step of: mounting the pair of substrates on a rotational table having an outer diameter smaller than an outer diameter of at least one of the pair of substrates so as to rotate the pair of substrates.

In still another embodiment of the invention, the step of placing one of the pair of substrates on the other substrate includes the step of: mounting the pair of substrates on a rotational table having an outer diameter smaller than an outer diameter of at least one of the pair of substrates so as to rotate the pair of substrates, and absorbing the radiation curable resin through the center holes of the pair of substrates while the pair of substrates are being rotated.

In still another embodiment of the invention, the step of curing the radiation curable resin includes the step of placing on the bonded pair of substrates a transparent plate having another diameter smaller than an outer diameter of at least one of the pair of substrates and irradiating the radiation curable resin with the radioactive rays passing through the transparent plate.

Alternatively, the method for fabricating an optical information medium of this invention includes the step of bonding a first substrate having a center hole and a second substrate having a center hole with a radiation curable resin interposed therebetween, wherein a sealant layer is formed of another radiation curable resin on a portion of one of the substrates closer to an inner circumference of the substrate, the viscosity of the another radiation curable resin when it is not cured being higher than that of the radiation curable resin for bonding formed on a portion of the substrate closer to an outer circumference of the substrate, and the radiation curable resins are cured by radioactive rays passing through the first or second substrate to bond the first and second substrates.

Alternatively, the method for fabricating an optical information medium of this invention includes the step of bonding a first substrate having a center hole and a second substrate having a center hole with a radiation curable resin interposed therebetween, wherein a sealant layer is formed by printing a radiation curable resin on a portion of one of the substrates closer to an inner circumference of the substrate, and the radiation curable resins are cured by radioactive rays passing through the first or second substrate to bond the first and second substrates.

Alternatively, the method for fabricating an optical information medium of this invention includes the step of bonding a first substrate having a center hole and a second substrate having a center hole with a radiation curable resin interposed therebetween, wherein a sealant layer is formed of a hot melt adhesive on a portion of one of the substrates closer to an inner circumference of the substrate, the first and second substrates are pressed with the radiation curable resin and the sealant layer being interposed therebetween, and the radiation curable resin is cured by radioactive rays passing through the first or second substrate to bond the first and second substrates.

Alternatively, the method for fabricating an optical information medium of this invention includes the step of bonding a first substrate having a center hole and a second substrate having a center hole with a radiation curable resin interposed therebetween, wherein a portion of the radiation curable resin protruding into the center holes is removed before the radiation curable resin is cured.

In one embodiment of the invention, the portion of the radiation curable resin protruding to the center holes is removed by use of a jig.

In another embodiment of the invention, the portion of the radiation curable resin protruding to the center holes is removed by absorbing through a suction port disposed on a boss of a spindle for rotating the substrates.

In still another embodiment of the invention, the portion of the radiation curable resin protruding to the center holes is removed by absorbing by a sponge disposed on a boss of a spindle for rotating the substrates.

Alternatively, the method for fabricating an optical information medium of this invention includes the steps of: placing one of a pair of substrates, each having a center hole, on the other substrate with a radiation curable resin interposed therebetween; and curing the radiation curable resin with radioactive rays capable of passing through at least one of the pair of substrates so as to bond together the pair of substrates, wherein a resin of which color density varies with the degree of the curing of the resin is used as the radiation curable resin, the color density of the resin is measured when the resin is irradiated with radioactive rays, and the curing of the resin is terminated when the resin obtains a predetermined color density.

Alternatively, the method for fabricating an optical information medium of this invention includes the step of bonding a first substrate and a second substrate with radiation curable resin interposed therebetween, wherein radioactive rays passing through the first substrate and radioactive rays passing through the second substrate radiate the radiation curable resin so as to cure the radiation curable resin.

In one embodiment of the invention, at least one of radiation intensity and duration of the radioactive rays is adjusted according to a radioactive ray transmittance of the substrate through which the radioactive rays pass.

According to still another aspect of the invention, an apparatus for fabricating an optical information medium is provided. The apparatus includes: means for applying a radiation curable resin, while a first substrate having a stopper for preventing the radiation curable resin from protruding into a center hole is being rotated, to a portion of the first substrate closer to an outer circumference of the first substrate with respect to the stopper, to form a donut-shaped resin layer; means for placing a second substrate on the first substrate; means for rotating the first and second substrates integrally; and means for irradiating the radiation curable resin with radioactive rays passing through at least one of the first and second substrates.

In one embodiment of the invention, the apparatus further includes means for placing a transparent plate on the bonded substrates.

In another embodiment of the invention, the apparatus further includes means for applying another radiation curable resin to a portion of the substrate closer to an inner circumference of the substrate with respect to the stopper.

In still another embodiment of the invention, the means for applying another radiation curable resin includes any of brush means, roller means, and clean printing means.

Alternatively, the apparatus for fabricating an optical information medium by bonding a first substrate having a center hole and a second substrate having a center hole with a radiation curable resin interposed therebetween of this invention includes: means for applying a first radiation curable resin on a portion of the first substrate closer to an inner circumference of the first substrate and applying a second radiation curable resin having a viscosity lower than the first radiation curable resin to a portion of the first substrate closer to an outer circumference of the first substrate while the first substrate is being rotated; means for placing the second substrate on the first substrate;

means for rotating the first and second substrates integrally; and means for irradiating the radiation curable resins with radioactive rays passing through at least one of the first and second substrates.

Alternatively, the apparatus for fabricating an optical information medium by bonding a first substrate having a center hole and a second substrate having a center hole with a radiation curable resin interposed therebetween of this invention includes: means for applying a portion of the radiation curable resin on a portion of the first or second substrate closer to an inner circumference of the first or second substrate; means for applying the remainder of the radiation curable resin on a portion of the first substrate closer to an outer circumference of the first substrate while the first substrate is being rotated; means for placing the second substrate on the first substrate; means for rotating the first and second substrates integrally; and means for irradiating the radiation curable resin with radioactive rays passing through at least one of the first and second substrates.

Alternatively, the apparatus for fabricating an optical information medium by bonding a first substrate having a center hole and a second substrate having a center hole with a radiation curable resin interposed therebetween of this invention includes: means for applying a hot melt adhesive to a portion of the first or second substrate closer to an inner circumference of the first or second substrate; means for applying the radiation curable resin to a portion of the first substrate closer to an outer circumference of the first substrate while the first substrate is being rotated; means for placing the second substrate on the first substrate; means for rotating the first and second substrates integrally; and means for irradiating the radiation curable resin with radioactive rays passing through at least one of the first and second substrates.

Alternatively, the apparatus for fabricating an optical information medium by bonding a first substrate having a center hole and a second substrate having a center hole with a radiation curable resin interposed therebetween of this invention includes: a table for integrally rotating the first and second substrates with the radiation curable resin before being cured interposed therebetween; and means for absorbing the radiation curable resin interposed between the first and second substrates through the center holes of the first and second substrates.

Alternatively, the apparatus for fabricating an optical information medium by bonding a first substrate having a center hole and a second substrate having a center hole with a radiation curable resin interposed therebetween of this invention includes: means for irradiating the radiation curable resin with radioactive rays passing through at least one of the first and second, substrates; and means for measuring a color density of the radiation curable resin.

In one embodiment of the invention, in the step of curing the radiation curable resin, the radioactive rays are reflected near the outer circumferences of the substrates placed on each other to irradiate the outer circumferences of the substrates.

In another embodiment of the invention, the radioactive rays are reflected by a mirror of a truncated cone shape disposed to surround the outer circumferences of the substrates.

In still another embodiment of the invention, the apparatus further includes means for irradiating the outer circumferences of the substrate placed on each other with the radioactive rays.

Thus, the invention described herein makes possible the advantages of (1) providing a thin optical information medium with good appearance and high mechanical strength without protrusion of a radiation curable resin to a center hole of the medium, (2) providing a method for fabricating such an optical information medium, and (3) providing an apparatus for fabricating such an optical information medium.

These and other advantages of the present invention will become apparent to those skilled in the art upon reading and understanding the following detailed description with reference to the accompanying figures.

DESCRIPTION OF THE PREFERRED EMBODIMENTS

Figure 1:
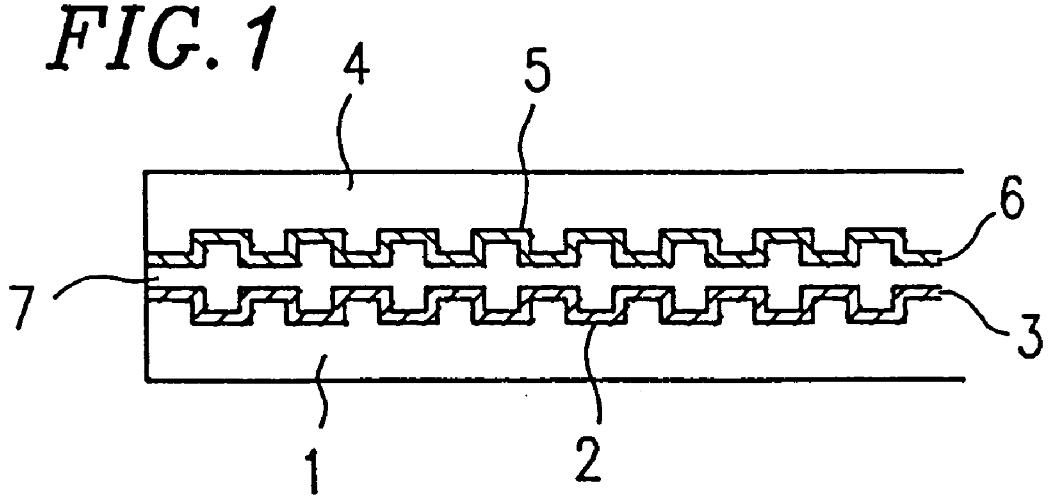
FIG. 1 is a sectional view of a conventional optical disk.

An optical information medium (optical disk) of the present invention is formed by bonding together a pair of substrates, each having a center hole, by use of a radiation curable resin. The optical disk of the present invention further includes a stopper for preventing the radiation curable resin from protruding into the center hole. The resin spreads in a space between the substrates covering at least a half of a clamp region for securing the optical disk to a turntable. The stopper is preferably a concave or convex portion formed on each of the substrates.

When a groove which is substantially concentric with the center hole is formed as the stopper on each substrate at a position closer to the inner circumference (closer to the center hole) with respect to the clamp region, the substrates are bonded together in the following manner. While one of the substrates is being rotated at low speed, a radiation curable resin is applied to a portion of the substrate closer to the outer circumference with respect to the groove, forming a donut-shaped resin layer. The other substrate is placed on the substrate with the resin therebetween. The two substrates are then rotated together at high speed, to allow the radiation curable resin to spread substantially uniformly in the space between the two substrates from the grooves to the outer circumferences of the substrates. Then, the radioactive rays are radiated to cure the radiation curable resin and thus to bond the two substrates integrally.

When a groove is formed at a position closer to the outer circumference with respect to the clamp region, the substrates are bonded together in the following manner. While one of the substrates is being rotated at low speed, a radiation curable resin is applied to a portion of the substrate closer to the outer circumference with respect to the groove, forming a donut-shaped resin layer. At the same time, the radiation curable resin is also applied to a portion of the substrate closer to the inner circumference with respect to the groove but away from the center hole. The other substrate is placed on the substrate with the resin therebetween. The two substrates are then rotated together at high speed, to allow the radiation curable resin to spread substantially uniformly in the space between the two substrates covering the portion closer to the outer circumferences with respect to the grooves and the portion closer to the inner circumferences with respect to the grooves but away from the center hole. Then, the radioactive rays are radiated to cure the radiation curable resin and thus to bond the two substrates integrally.

In the former case where the groove is formed at a position closer to the inner circumference with respect to the clamp region, the groove serves as a reservoir for excessive resin produced when the resin spreads in the space between the two substrates. This prevents the resin from spreading beyond the groove to the portion closer to the inner circumference and thus the resin from protruding into the center hole. Since the resin spreads in the entire clamp region, the resultant disk has high strength.

In the latter case where the groove is formed at a position closer to the outer circumference with respect to the clamp region, a thin radiation curable resin layer is formed on a portion closer to the inner circumference with respect to the groove, besides the resin layer on a portion closer to the outer circumference with respect to the groove, before the two substrates are bonded together. Thus, the clamp region is supplied with a sufficient amount of resin. Since the resin layer on the inner circumference portion is formed thin and away from the center hole, the resin is prevented from protruding into the center hole.

(Example 1)

A first example of the optical information medium according to the present invention will be described.

Figure 3:
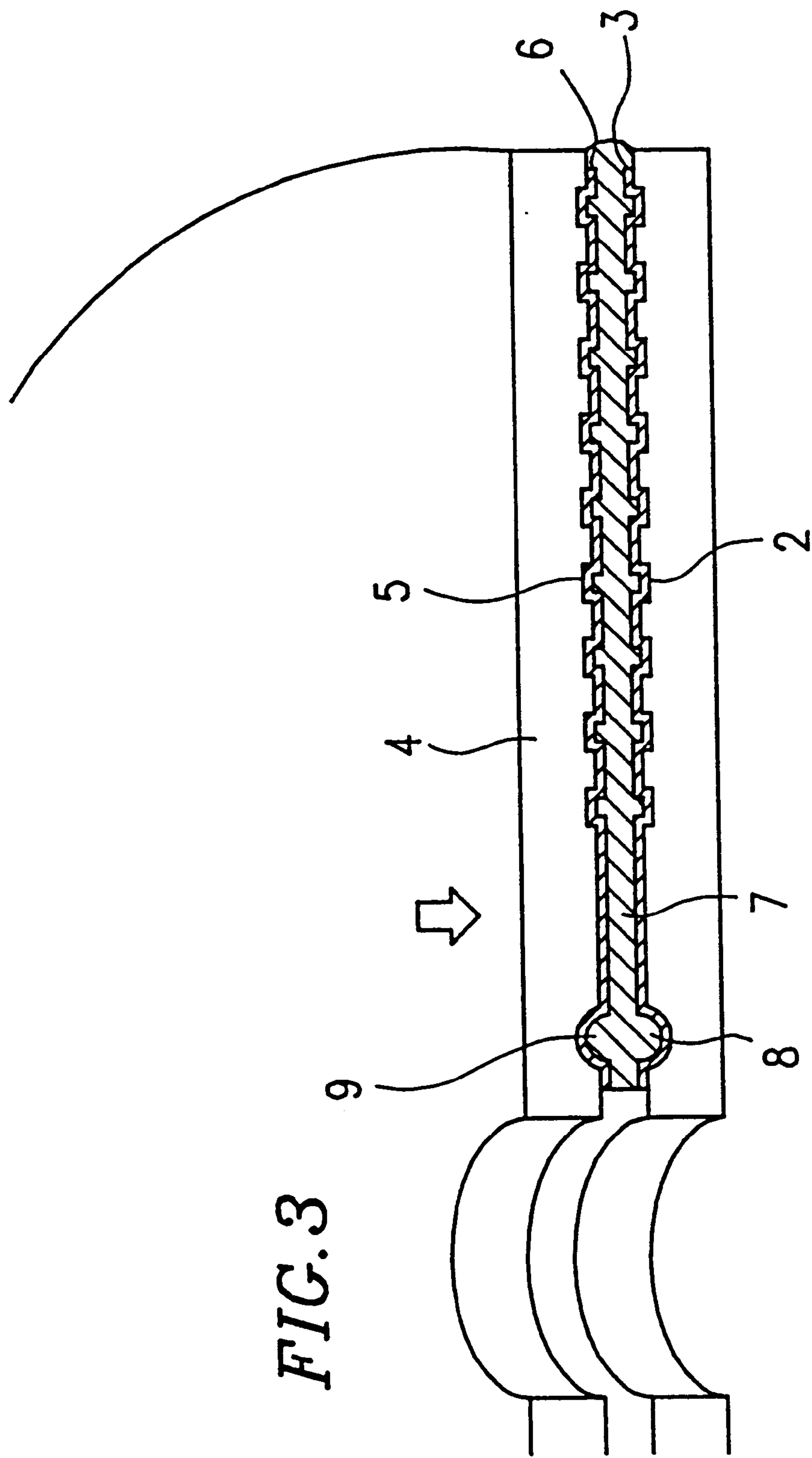
FIG. 3 is a partial perspective sectional view of an optical disk of Example 1 according to the present invention.

FIG. 3 shows an optical disk of Example 1. The optical disk includes disk-shaped first and second substrates 1 and 4 (thickness: 0.6 mm each) bonded together integrally with a radiation curable resin 7. The first substrate 1 has a first information signal surface 2, on which a first reflection film 3 (thickness: 0.03 $\mu$m to 0.2 $\mu$m) made of aluminum as a main component is formed. The second substrate 4 has a second information signal surface 5, on which a second reflection film 6 is formed. The first and second substrates 1 and 4 are bonded together with the information signal surfaces 2 and 5 facing each other with the radiation curable resin 7 interposing.

Grooves and pits are formed on the information signal surfaces 2 and 5 of the substrates 1 and 4. When the disk is of a rewritable type, a recording film (not shown) is formed on the information signal surface 2 or 5 of at least one of the substrates 1 and 4.

In general, an optical disk has a clamp region (indicated by the arrow in FIG. 3) for securing the optical disk to a turntable of a recording/reproduction apparatus. The clamp region, which is of a donut shape, occupies the region of the disk ranging from 11 mm to 16.5 mm from the center of the disk, in the case of DVDs. In other words, the clamp region is a ring-shaped region with an inner diameter of 22 mm and an outer diameter of 33 mm.

In Example 1, grooves 8 and 9 which are substantially concentric with the center hole are formed on the first and second substrates 1 and 4, respectively. The function of the grooves 8 and 9 will be described later in detail. In Example 1, the grooves 8 and 9 have a depth of 0.3 mm or less and a width of 3 mm or less, and are formed at a position closer to the inner circumference (closer to the disk center) with respect to the outer rim of the clamp region. The depth of the grooves is preferably equal to or less than a half the thickness of each substrate.

If the grooves 8 and 9 are formed at a position closer to the outer circumference with respect to the outer rim of the clamp region, the clamp region is not supplied with a sufficient amount of resin. In Example 1 where the radiation curable resin is used for bonding the substrates together, the gap between the substrates is about 50 $\mu$m, five times as large as that when a hot melt adhesive is used (about 10 $\mu$m). The Inventors have found from experiments that, with the large gap between the substrates, if the clamp region is not supplied with a sufficient amount of resin, the clamp region fails in stably securing the optical disk to a turntable.

The Inventors have further found that, in order to obtain stable clamping, it is necessary to supply the radiation curable resin to at least a half of the clamp region. Specifically, in the case of DVDs, the grooves 8 and 9 need to be positioned so that the distance between the groove center and the disk center is 13.75 mm (=11/2+16.5/2) or less. When the grooves 8 and 9 with a width of 3 mm are formed so that the groove center is positioned at a distance of 12.5 mm or less from the disk center, substantially the entire clamp region will be supplied with the radiation curable resin. Accordingly, the grooves 8 and 9 are preferably formed so that the groove center is positioned at a distance of 12.5 mm or less from the disk center.

The insides of the grooves 8 and 9 are not necessarily filled with the radiation curable resin 7. Accordingly, the inner end of the radiation curable resin 7 is positioned at the outer rims of the grooves 8 and 9 or at the inner rims of the grooves including the inside of the grooves. FIG. 3 shows the latter case as an example.

The grooves 8 and 9 can be formed by use of a jig for a stamper having a pattern of information signals when the substrates 1 and 4 are formed by injection molding using the stamper. The size and shape of the grooves 8 and 9 can be controlled by adjusting the size and shape of the jig. The shape of the grooves 8 and 9 is not limited to that shown in FIG. 3. Only one groove, instead of the grooves 8 and 9, can be formed on either one of the substrates 1 and 4. Alternatively, a plurality of grooves can be formed close to one another on one substrate.

Figure 4:
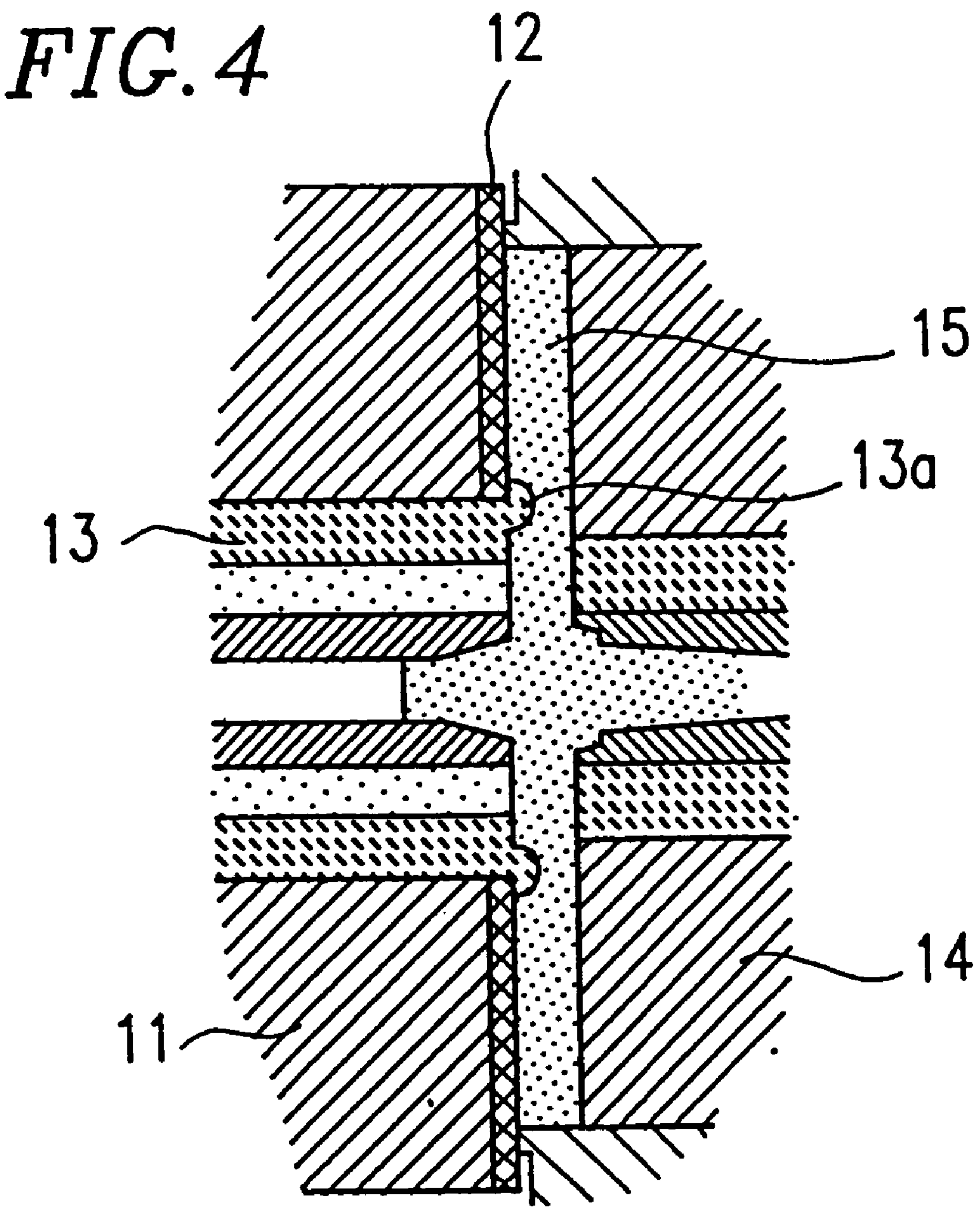
FIG. 4 is a partial sectional view of an injection molding apparatus used for fabricating substrates for the optical disk of Example 1 according to the present invention.

FIG. 4 shows the injection molding of the substrate. A donut-shaped stamper 12 having a center hole is attached to one surface of a cylindrical movable mold 11 with a jig 13. A ring-shaped convex portion 13*a* is formed on an end of the jig 13 and presses the stamper 12 against the movable mold 11. The substrate 1 or 4 is formed by injecting resin into a cavity 15 formed between the movable mold 11 and a fixed mold 14 from right as seen from the figure and then cooling the resin. At this formation of the substrate, the groove 8 or 9 is formed on the substrate 1 or 4 due to the convex portion 13*a* of the jig 13 for the stamper 12. Thus, the size and shape of the grooves 8 and 9 can be controlled by adjusting the size and shape of the convex portion 13*a* of the FIG. 13.

Next, referring to FIGS. 5A to 5D, a method for fabricating the optical disk according to the present invention will be described.

First, the first substrate 1 with the first information signal surface 2 is formed by injection molding and the like. The first reflection film 3 is formed on the first information signal surface 2 by sputtering and vapor deposition. The second substrate 4 with the second information signal surface 5 is formed by injection molding and the like. The second reflection film 6 is formed on the second information signal surface 5 by sputtering and vapor deposition. The reflection films 3 and 6 are made of metal including aluminum as a main component.

Figure 5A:
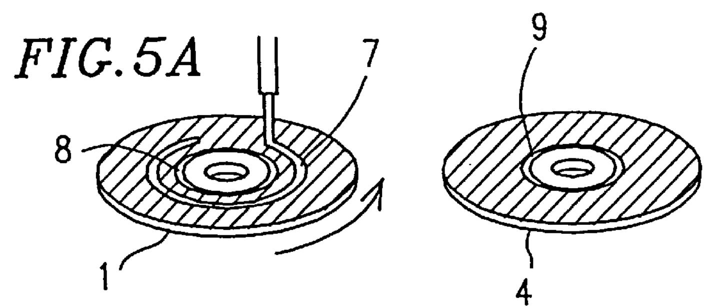
FIGS. 5A to 5D are perspective views showing a fabrication process of the optical disk of Example 1 according to the present invention.
Figure 5B:
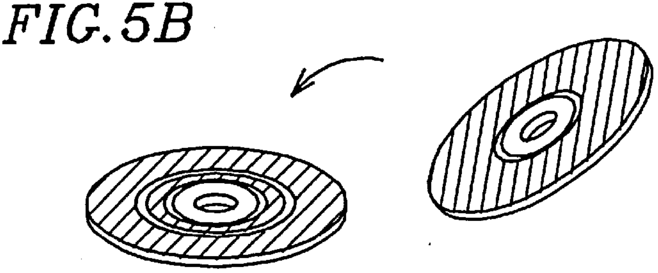

While the first substrate 1 is rotated at low speed (20 to 120 rpm), the radiation curable resin 7 is applied to a portion of the substrate 1 closer to the outer circumference with respect to the groove 8 to form a donut-shaped resin layer (FIG. 5A). The second substrate 4 is placed on the first substrate 1 so that the second reflection layer 6 faces the radiation curable resin 7 (FIG. 5B). The radiation curable resin 7 spreads in the space between the substrates 1 and 4. At this time, the grooves 8 and 9 serve as reservoirs for excessive resin, preventing the resin from spreading beyond the grooves toward the inner circumference and thus the resin from protruding into the center hole. In place of the continuous ring-shaped grooves, a plurality of concave portions can be arranged at positions close to one another and apart from the disk center by an equal distance.

Figure 5C:
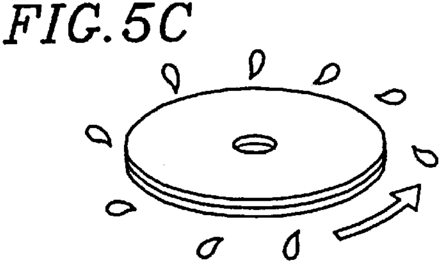
Figure 6:
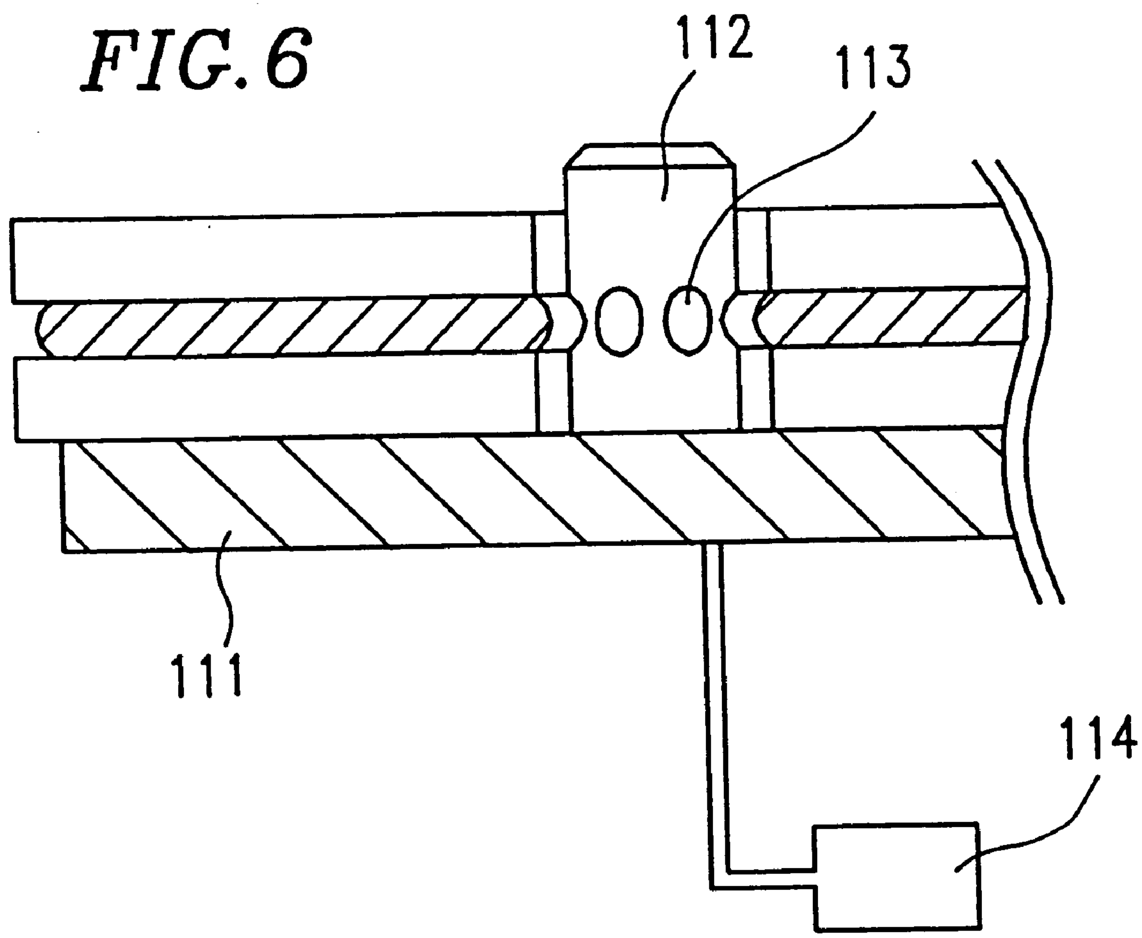
FIG. 6 is a partial sectional view of an apparatus used for fabricating the optical disk of Example 1 according to the present invention.

The substrates 1 and 4 are rotated together at high speed (300 to 5000 rpm), to allow the radiation curable resin to spread substantially uniformly in the space between the two substrates covering the portion from the grooves to the outer circumferences (FIG. 5C). In Example 1, this step is performed using an apparatus shown in FIG. 6. The apparatus includes a table 111 for rotating an optical disk, a boss 112 having suction ports 113, and a suction pump 114 connected to the suction ports 113. Since the radiation curable resin has fluidity before being cured, the resin can be absorbed by the suction pump 114 via the suction ports 113 formed on the boss 112 on the table 111. In this way, the radiation curable resin can spread uniformly in the space between the substrates. In this example, the number of the suction ports 113 is 2 or more, each having an inner diameter of 1 mm or more. The suction force can be experimentally optimized in accordance with the viscosity of the resin, the rotation speed and duration of the table 111 and the like.

The outer diameter of the table 111 is preferably smaller than that of the first and second substrates 1 and 4, so as to prevent part of the radiation curable resin protruding from the outer circumferences of the rotating substrates from attaching to the table 111. In Example 1, a radius Rt of the table 111 is set at 59 mm or less, which is smaller than a radius Rs of the substrates (60 mm) by 1 mm or more. If the radius Rt of the table 111 is too small, the table 111 fails to support the optical disk stably. Thus, the radius Rt of the table 111 is preferably 70% or more of the radius Rs of the optical disk.

As described above, a centripetal force is provided by absorbing the radiation curable resin at the rotation of the substrates. This prevents a large amount of resin from moving to the outer circumference of the optical disk. Further, any resin which may protrude from the outer circumference of the optical disk can be prevented from attaching to the table and polluting the disk by making the size of the table smaller than that of the optical disk.

By absorbing the resin through the center hole of the optical disk, it is ensured that the resin remains in the clamp region during the high-speed rotation, and the resin can spread uniformly. Further, since excessive resin protruding into the center hole of the optical disk is pumped via the suction ports 113 and removed, the resultant optical disk has good appearance.

Sponges can be disposed on the boss 112 in place of the suction ports 113 for absorbing the radiation curable resin 7. In this case, similarly, excessive resin protruding into the center hole of the optical disk can be removed.

Figure 5D:
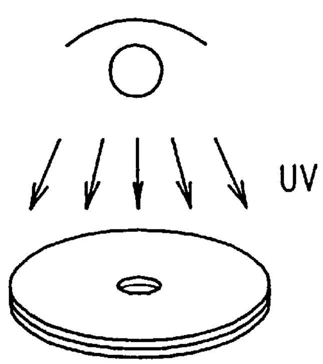

Thereafter, radioactive rays are radiated to the radiation curable resin through the second substrate 4 and the second reflection film 6 to cure the resin, so as to bond the substrates 1 and 4 integrally (FIG. 5D).

Ultraviolet (UV) rays can be used as the radioactive rays, and a UV curable resin as the radiation curable resin. The reflection film made of metal including aluminum as a main component allows a small amount of UV rays to transmit therethrough (transmittance: 1% or less) which is large enough to cure the UV curable resin if the thickness of the reflection film is 0.1 $\mu$m or less.

Alternatively, a protection film made of the radiation curable resin can be formed on the reflection film on the first or second substrate, before the above process including the application of the radiation curable resin for bonding, the placement of the other substrate on the resin, and the radiation of radioactive rays.

Figure 7:
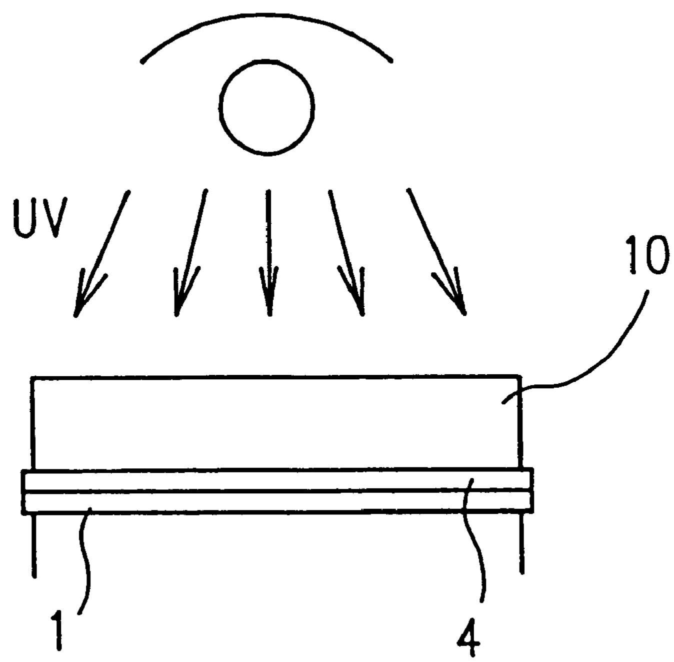
FIG. 7 is a sectional view showing a step for fabricating the optical disk of Example 1 according to the present invention.

Heat is generally generated at the curing of the radiation curable resin by radioactive ray radiation. The substrates may sometimes be warped a little by this heat. To prevent this trouble, a transparent plate can be placed on the second substrate during irradiation. The resin is then cured with radioactive rays passing through the transparent plate, the second substrate, and the second reflection film. As a result, the substrates are prevented from warping, and a disk with a negligibly small tilt can be fabricated. FIG. 7 shows this alternative step, where a transparent plate 10 presses the integrated first and second substrates 1 and 4. The transparent plate can be made of glass.

In Example 1, the substrates both having information signals recorded thereon were bonded together. Alternatively, one of the substrates can be a dummy substrate where information signals have not been recorded.

Also, in the case of a double-layer disk where a semi-transparent film is formed on the information signal surface of the substrate 4, the radiation curable resin can be irradiated with radioactive rays through the semi-transparent substrate 4. Thus, the substrates can be easily bonded together.

The grooves 8 and 9 on the substrates prevent excessive resin from spreading beyond the grooves to the inner circumference portions. However, the resin is not necessarily accumulated in the grooves uniformly. If the resin in the grooves 8 and 9 is not uniform and air portions and resin portions are formed in a mixed condition in the grooves, the appearance of the resultant disk will be poor. This is why the reflection films are also formed on the grooves 8 and 9 as shown in FIG. 3. By forming the reflection films, the grooves 8 and 9 become invisible from outside and the good appearance can be maintained.

(Example 2)

Figure 8:
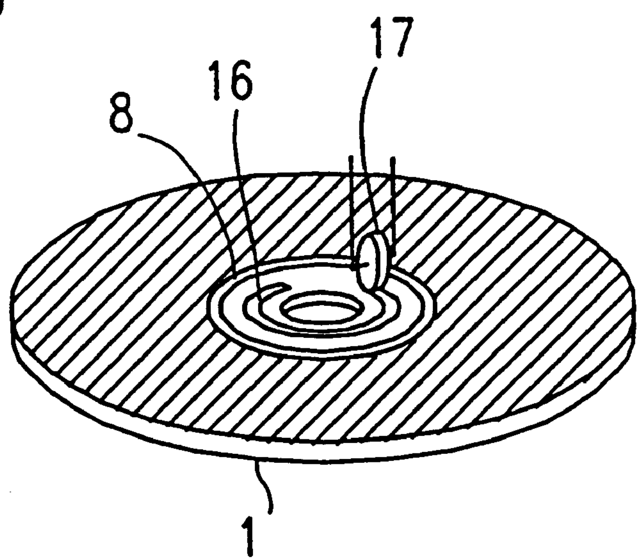
FIG. 8 is a perspective view showing a step for fabricating an optical disk of Example 2 according to the present invention.

In example 2, an optical disk where a groove is formed on each substrate at a position closer to the outer circumference with respect to the clamp region will be described with reference to FIGS. 8 and 9.

As described above, in order to prevent the resin from protruding to the center hole of the substrates, the resin should be applied to a portion of a substrate closer to the outer circumference with respect to the outer rim of the groove. This means, however, that no resin is applied to the clamp region and therefore the resultant disk is not secured to a turntable. In Example 2, in order to prevent this trouble, the radiation curable resin is also applied to a portion of the substrate closer to the inner circumference with respect to the groove to form a resin layer 16, separately, before the application of the radiation curable resin to a portion closer to the outer circumference of the groove 8. The resin layer 16 can be formed by use of a roller 17 with a width of about 5 to 10 mm as shown in FIG. 8. As in Example 1, the resin layer 16 is preferably positioned away from the center hole so as to prevent the resin from protruding into the center hole of the substrate.

Figure 9:
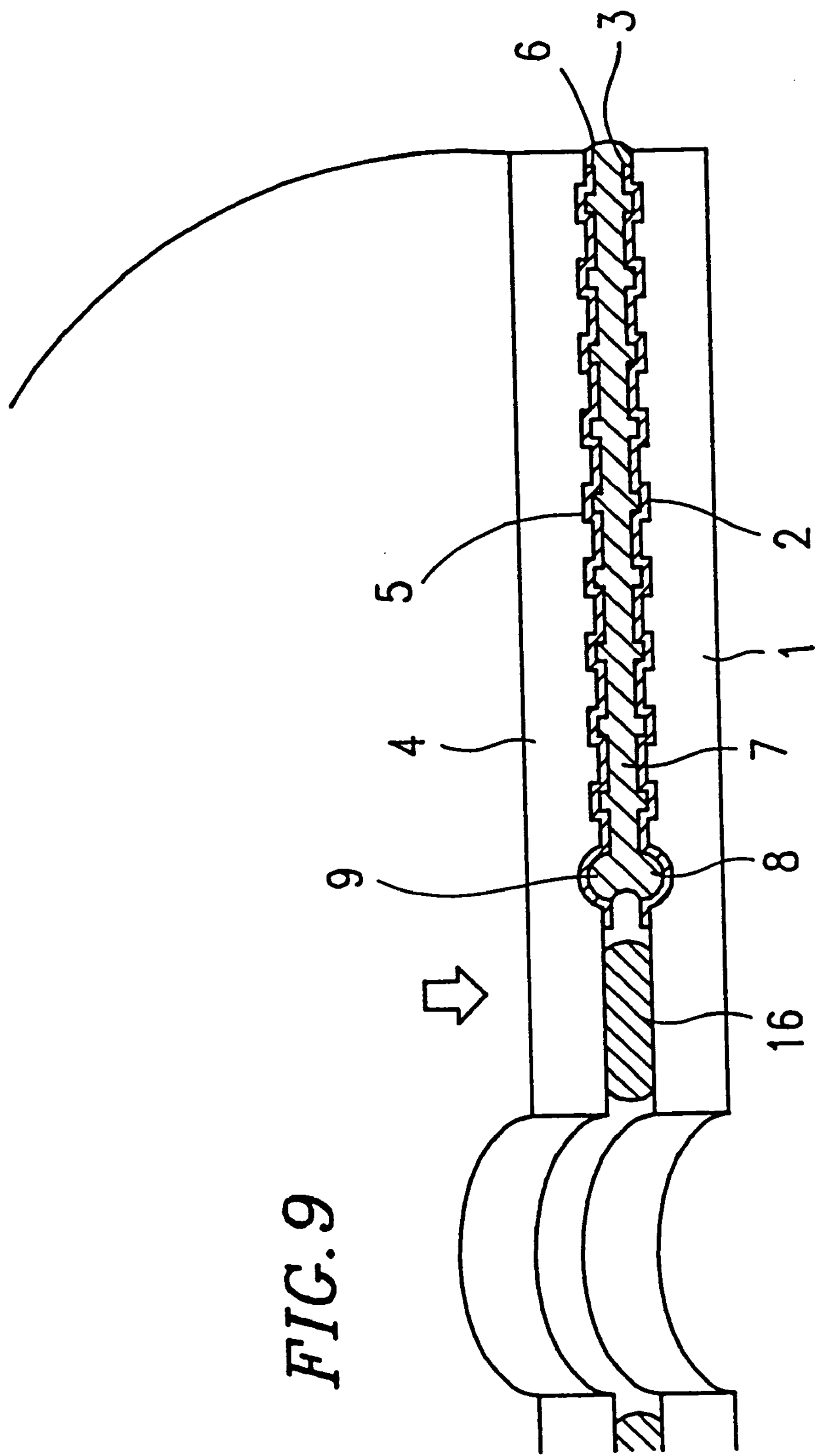
FIG. 9 is a partial perspective sectional view of the optical disk of Example 2 according to the present invention.

FIG. 9 shows the optical disk of Example 2. The same components are denoted by the same reference numerals as those in FIG. 3. The grooves of the substrates are formed at a position closer to the outer circumference with respect to the outer rim of the clamp region (indicated by the arrow in FIG. 9). The resin layer 16 is formed on a portion of the substrate closer to the inner circumference with respect to the grooves, separately from the application of the radiation curable resin 7 to a portion of the substrate closer to the outer circumference with respect to the grooves. As a result, though the resin may not be so uniform, a sufficient amount of resin can be supplied in the clamp region and cured.

Both the optical disks of Examples 1 and 2 are of a double-sided reproduction type. In the case of an optical disk of a single-sided reproduction type, the substrate 4 can be a transparent dummy plate having neither an information signal surface nor a reflection film. In this case, the radiation curable resin is irradiated with radioactive rays through the transparent dummy plate. This makes it possible to cure the resin in a shorter time than the case of the optical disk of the double-sided reproduction type and thus shorten the production time.

Also, in the case of a double-layer disk where a semi-transparent film is formed on the information signal surface of the substrate 4, the radiation curable resin can be irradiated with radioactive rays through the semi-transparent substrate 4. Thus, the substrates can be easily bonded together.

(Example 3)

A third example of the optical information medium according to the present invention will be described with reference to FIGS. 10, 11, 12, and 13A to 13D.

Figure 10:
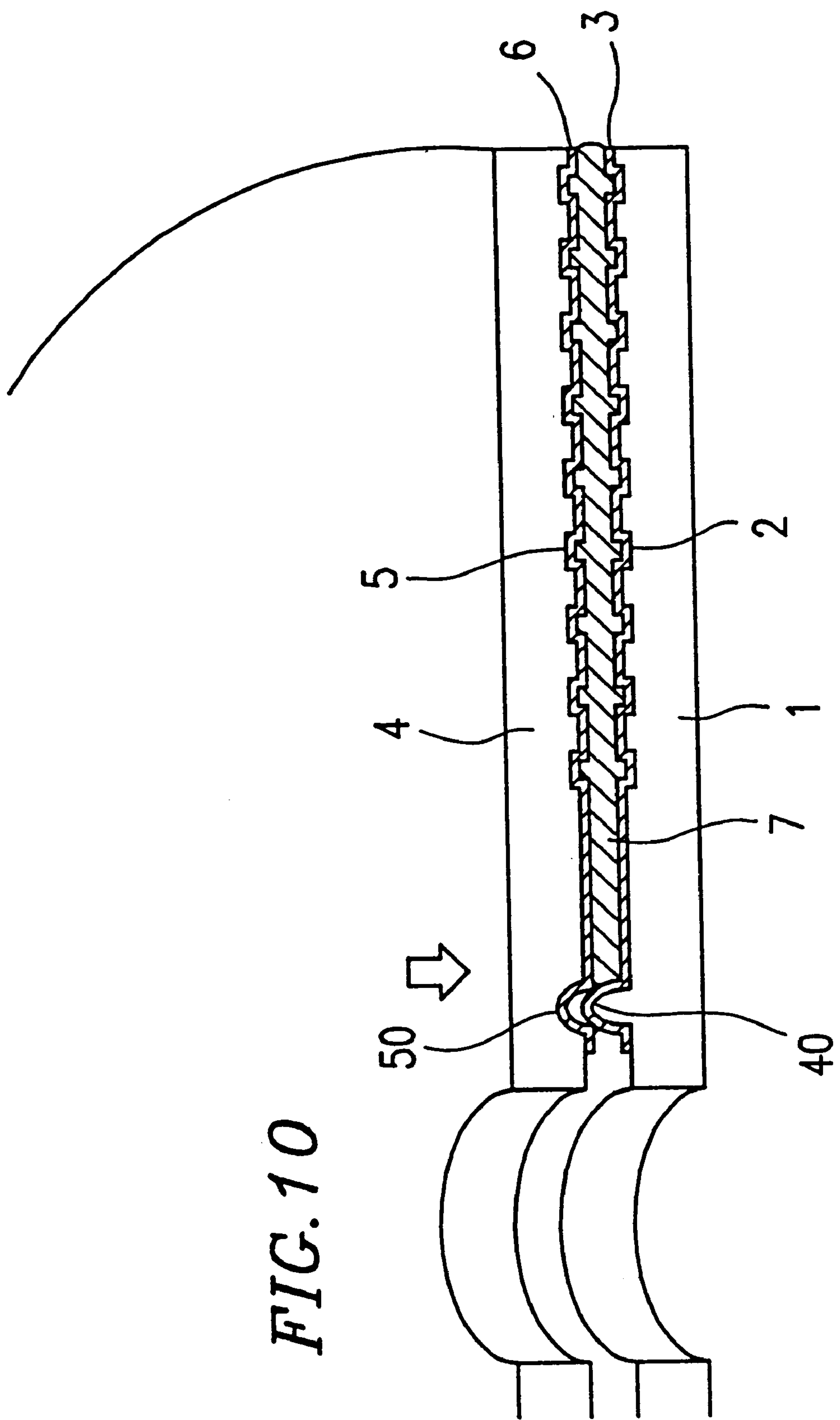
FIG. 10 is a partial perspective sectional view of an optical disk of Example 3 according to the present invention.

As shown in FIG. 10, a first substrate 1 has a first information signal surface 2, on which a first reflection film 3 made of metal and the like including aluminum as a main component is formed. A second substrate 4 has a second information signal surface 5, on which a second reflection film 6 is formed. The substrates 1 and 4 have a protrusion 40 (height: 0.01 to 0.2 mm, width: 0.1 to 2 mm) and a groove 50 (depth: 0.05 to 0.3 mm, width: 0.3 to 3 mm), respectively. A radiation curable resin 7 spreads in the space between the substrates 1 and 4 from the outer rims of the protrusion 40 and the groove 50 to the outer circumferences of the substrates or from the inner rims of the protrusion 40 and the groove 50 to the outer circumferences of the substrates including the protrusion 40 and the groove 50. FIG. 10 shows the latter case as an example.

The region indicated by the arrow in FIG. 10 is the clamp region for securing the optical disk to a turntable of a reproduction apparatus. In the clamp region, the radiation curable resin needs to be cured sufficiently, and to attain this, the protrusion 40 and the groove 50 need to be located closer to the center hole with respect to the center of the clamp region. Further, the two substrates need to be aligned with respect to the center of the center hole to avoid decentering and cured sufficiently.

The protrusion 40 and the groove 50 of Example 3 serve as the stopper, as the grooves 8 and 9 shown in FIG. 3, for preventing the radiation curable resin from protruding into the center hole. The groove 50 on the substrate 4 may be omitted. In this case, only the protrusion 40 serves as the stopper for the radiation curable resin. Alternatively, another protrusion can be formed on the substrate 4 in place of the groove 50. In this case, the protrusion on the substrate 4 needs to be located so as not to collide with the protrusion 40 of the substrate 1. The protrusion 40 and the groove 50 of Example 3 are of a continuous ring shape surrounding the center holes of the substrates. However, the protrusion 40 and the groove 50 do not necessarily have to be continuous. For example, a plurality of protrusions can be arranged at positions apart from the disk center by an equal distance. Alternatively, a plurality of protrusions can be arranged on both of the substrates so that the protrusions on one substrate can engage with the protrusions on the other substrate when the two substrates are bonded together.

Next, a method for fabricating the optical disk shown in FIG. 10 will be described with reference to FIGS. 11, 12, and 13A to 13D.

The first substrate 1 having the first information signal surface 2 is formed with a transparent resin such as polycarbonate by injection molding and the like. The first reflection film 3 is formed on the first information signal surface 2 by sputtering and vapor deposition. The second substrate 4 having the second information signal surface 5 is formed by injection molding and the like, and the second reflection film 6 is formed on the second information signal surface 5 by sputtering and vapor deposition. The first and second reflection films 3 and 6 are made of metal including aluminum as a main component.

Figure 11:
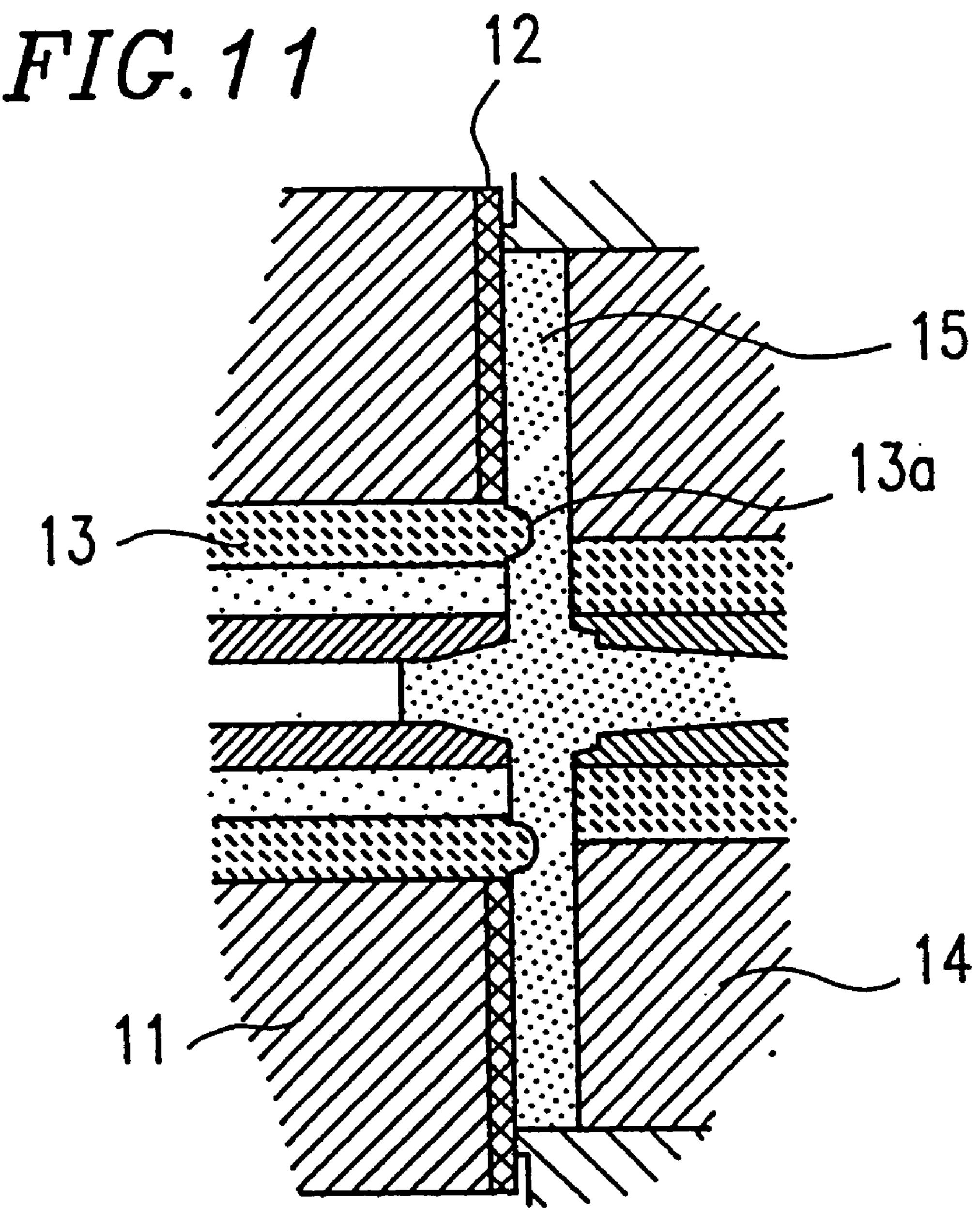
FIG. 11 is another injection molding apparatus used for fabricating a substrate of the optical disk of Example 3 according to the present invention.
Figure 12:
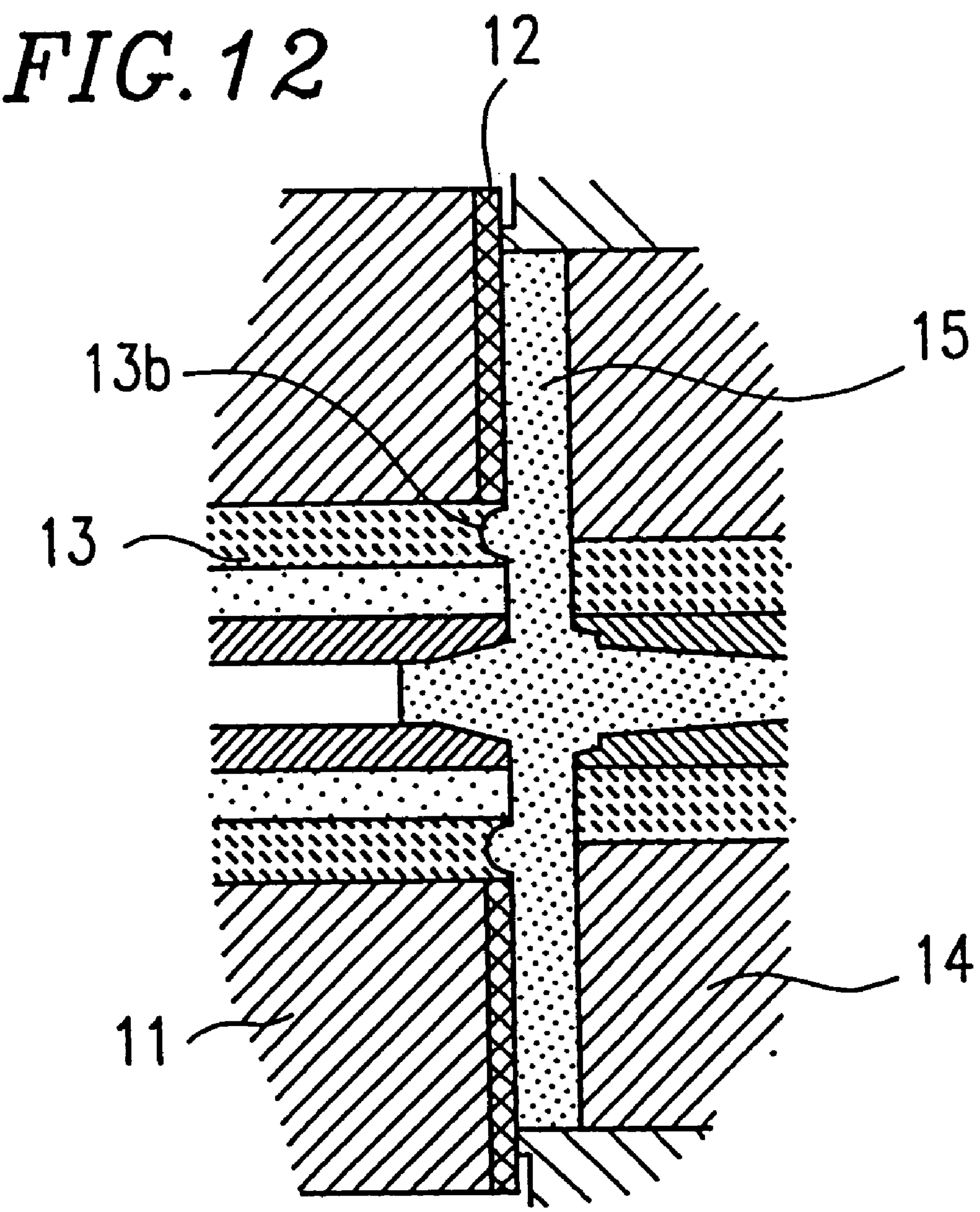
FIG. 12 is yet another injection molding apparatus used for fabricating a substrate of the optical disk of Example 3 according to the present invention.

The protrusion 40 which is substantially concentric with the center hole is formed on the first substrate 1, while the groove 50 is formed on the second substrate 4 so as to face the protrusion 40 of the first substrate 1 when the substrates 1 and 4 are bonded together. The protrusion 40 and the groove 50 can be formed by use of a jig for a stamper having a pattern of information signals when the substrates 1 and 4 are formed by injection molding using the stamper. FIGS. 11 and 12 show the injection molding of the substrate. A stamper 12 is attached to one surface of a movable mold 11. The substrate is formed by injecting a resin into a cavity 15 formed between the movable mold 11 and a fixed mold 14 and then cooling the resin. At this formation of the substrate, the groove 50 is formed on the substrate 4 by forming a convex portion 13*a* on a jig 13 as shown in FIG. 11, or the protrusion 40 is formed on the substrate 1 by forming a concave portion 13*b* on the jig 13 as shown in FIG. 12.

Figure 13A:
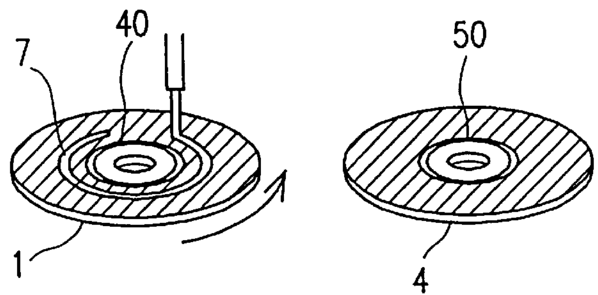
FIGS. 13A to 13D are perspective views showing a fabrication process of the optical disk of Example 3 according to the present invention.
Figure 13B:
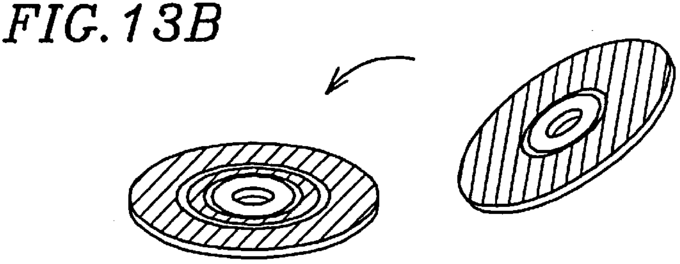
Figure 13C:
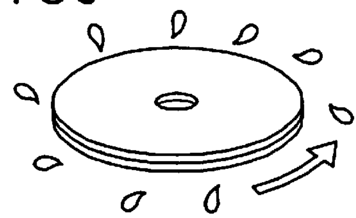

As shown in FIG. 13A, while the substrate 1 is being rotated at low speed, the radiation curable resin 7 is applied to a portion of the substrate 1 closer to the outer circumference with respect to the protrusion 40 to form a donut- or spiral-shaped resin layer. Then, as shown in FIG. 13B, the second substrate 4 is placed on the first substrate 1 so that the second reflection film 6 faces the radiation curable resin 7. As shown in FIG. 13C, the radiation curable resin 7 spreads in the space between the substrates 1 and 4, while the substrates are being rotated at high speed. At this time, the spread of the resin is blocked by the protrusion 40, preventing the resin from spreading beyond the protrusion 40 toward the center hole. Thus, the radiation curable resin 7 spreads substantially uniformly in the space between the substrates 1 and 4 from the protrusion 40 to the outer circumferences of the substrates.

Figure 13D:
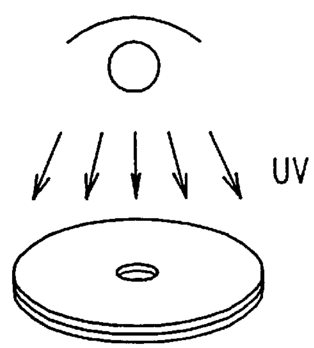

Thereafter, as shown in FIG. 13D, radioactive rays are radiated to the radiation curable resin via the second substrate 4 and the second reflection film 6 to cure the resin, so as to bond the substrates 1 and 4 integrally.

UV rays can be used as the radioactive rays, and a UV curable resin as the radiation curable resin. The reflection film made of metal including aluminum as a main component allows a small amount of UV rays to transmit therethrough (transmittance: 1% or less) so as to cure the UV curable resin if the thickness of the reflection film is 0.1 $\mu$m or less.

Alternatively, a protection film made of the radiation curable resin can be formed on the reflection film on the first or second substrate, before the process shown in FIGS. 3A to 3D including the application of the radiation curable resin for bonding, the placement of the other substrate on the resin, and the radiation of radioactive rays.

(Example 4)

Figure 14:
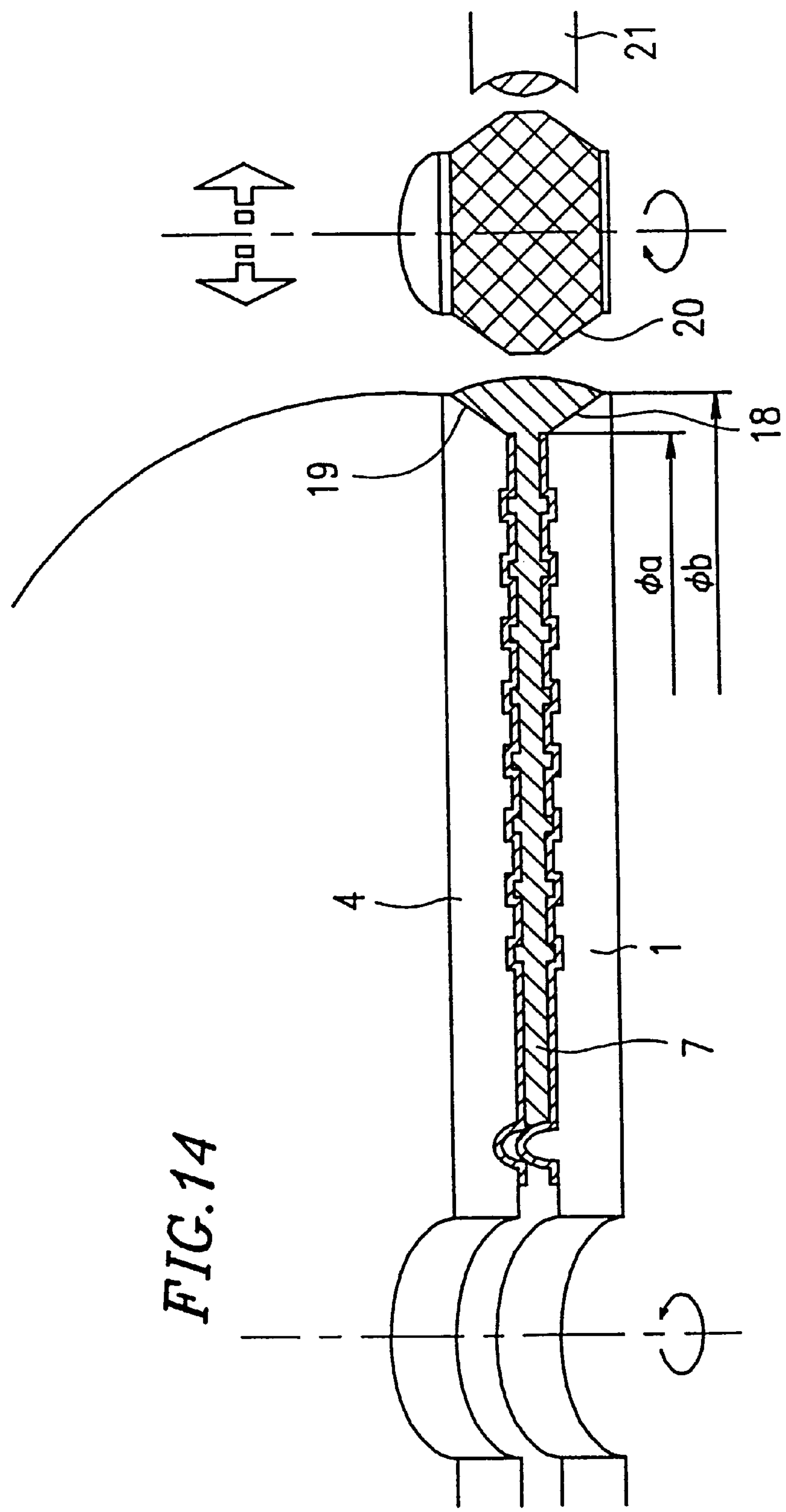
FIG. 14 is partial perspective sectional view showing a step for fabricating an optical disk of Example 4 according to the present invention.

In Example 4, a method for shaping the outer end of the radiation curable resin at the outer circumferences of the substrates will be described with reference to FIG. 14.

An optical disk having two substrates bonded together needs to have mechanical strength large enough to be durable against drop, shock, and the like. Conventionally, however, the following problem arises: The radiation curable resin used for bonding the two substrates tends to spread only to the signal recording portions, not reaching the outer circumferences of the substrates. Even if the resin reaches the outer circumferences, it is difficult to obtain uniform spread of the resin. If the resin with non-uniform spread is cured by being irradiated with radioactive rays, the substrates tend to easily separate from each other at the end rims thereof due to drop and shock, lowering the mechanical strength of the resultant disk. In order to solve this problem, an outer diameter ϕa of the bonding surface of each of the first and second substrates 1 and 4 is made slightly smaller than an outer diameter ϕb of the other surface opposite to the bonding surface, forming a tapered end at the outer circumference of each of the substrates 1 and 4 and thus forming tilt faces 18 and 19, respectively. As a result, a recess is formed around the outer circumference of the resultant optical disk. The recess is filled with the radiation curable resin. The tapered end (tilt face) can be formed only on one of the substrates 1 and 4. The tapered ends can be of any shape as far as the relationship $\phi a \leqq \phi b$ is satisfied.

On the tilt faces of the substrates is accumulated only excessive resin swept off from the space between the substrates 1 and 4 by high-speed rotation of the substrates via a rotational table (not shown) disposed below the substrates. The resin accumulated on the tilt faces is therefore not uniform. In this example, a rotational transfer roller 20 having a shape and size equal to those of the recess formed by bonding the first and second substrates 1 and 4 is used. The size of the roller 20 can be slightly smaller than that of the recess. The roller 20 is driven in the directions shown in FIG. 14 so as to abut against the substrates. When the roller 20 is moved toward the substrates, the rotational table is switched to low speed to allow the roller 20 to abut against the substrates and rotate in a direction reverse to the rotational direction of the rotational table. Alternatively, the roller can be fixed. The radiation curable resin is extracted from an extraction nozzle 21 at an appropriate time so that the roller 20 can always transfer the resin to the substrates. Thus, the shaping of the outer circumferences of the substrates can be maintained. By curing the resin by the radiation of radioactive rays under this state, an optical disk with high mechanical strength can be fabricated.

(Example 5)

Figure 15:
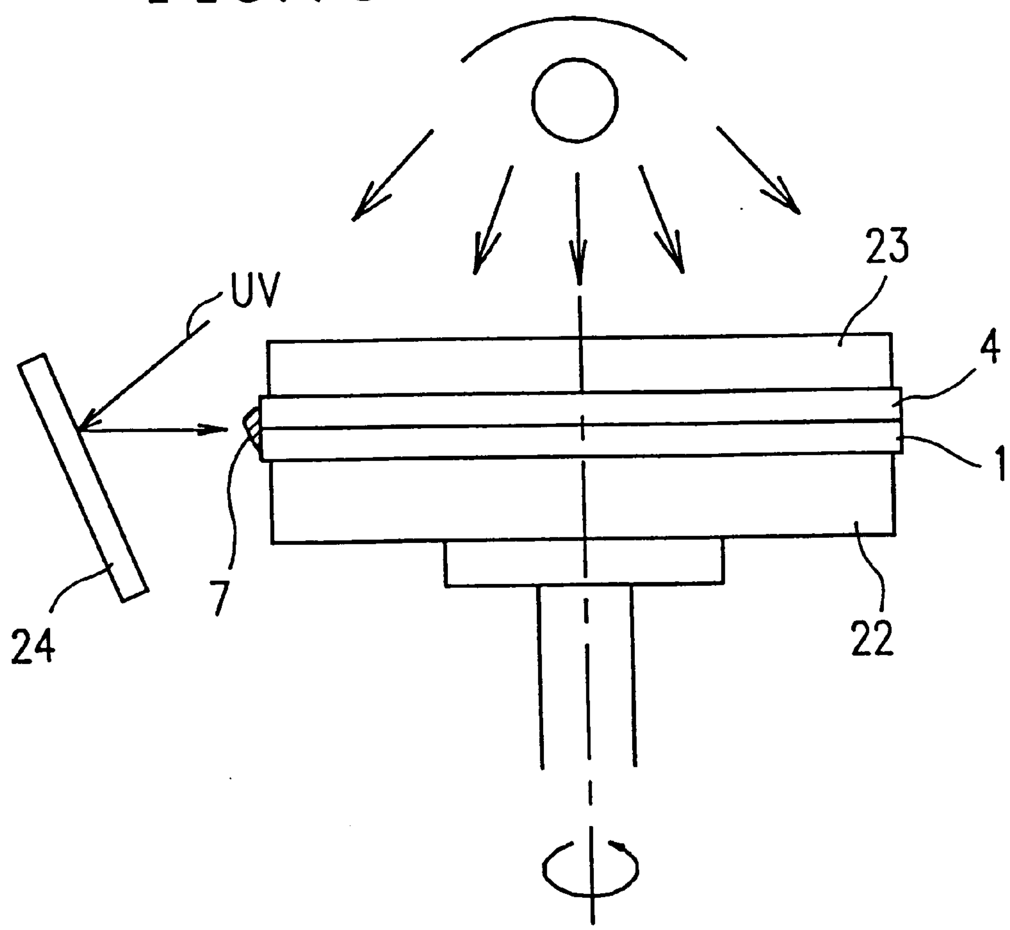
FIG. 15 is a sectional view showing a step for fabricating an optical disk of Example 5 according to the present invention.

In Example 5, a method for curing resin will be described with reference to FIG. 15. Since radioactive rays are linear, the radiation curable resin at the circumferences of the substrates may not be irradiated sufficiently enough to be cured completely within a predetermined irradiation time. In order to solve this problem, a reflector 24 is disposed at a position to enable the circumferences of the substrates to be irradiated while a rotational table 22 is rotated at low speed. With this structure, the radiation curable resin 7 in the space between the substrates as well as at the circumferences of the substrates can be uniformly and stably cured.

Alternatively, a mirror of a truncated cone shape can be disposed to surround the circumferences of the substrates. In this case, it is not necessary to rotate the table.

(Example 6)

Figure 16:
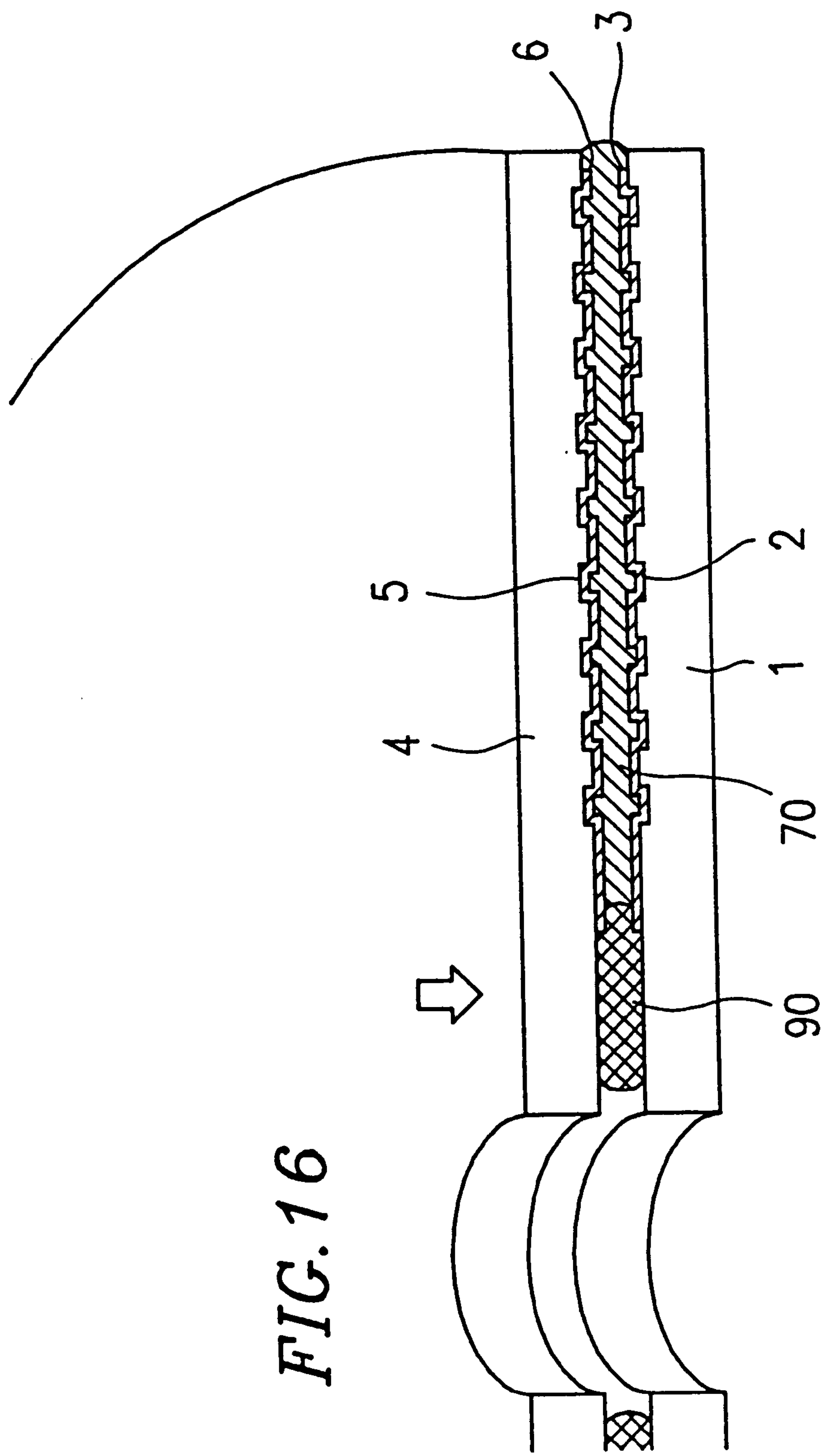
FIG. 16 is a partial perspective sectional view of an optical disk of Example 6 according to the present invention.

An optical information medium of Example 6 will be described with reference to FIG. 16. First and second substrates 1 and 4 have first and second information signal surfaces 2 and 5, on which first and second reflection films 3 and 6 are formed, respectively. A radiation curable resins 70 and 90 are interposed between the first and second substrates 1 and 4. The resin 90 serves as a sealant preventing the resin from protruding into the center hole of the substrates.

Referring to FIGS. 17A to 17D, a method for fabricating such an optical disk for double-sided reproduction according to the present invention will be described.

The first substrate 1 having the first information signal surface 2 and the second substrate 4 having the second information signal surface 5 are formed with a transparent resin such as polycarbonate by injection molding and the like. The first and second reflection films 3 and 6 are formed on the information signal surfaces 2 and 5, respectively, by sputtering and vapor deposition. The reflection films 3 and 6 are made of metal including aluminum as a main component, for example.

Figure 17A:
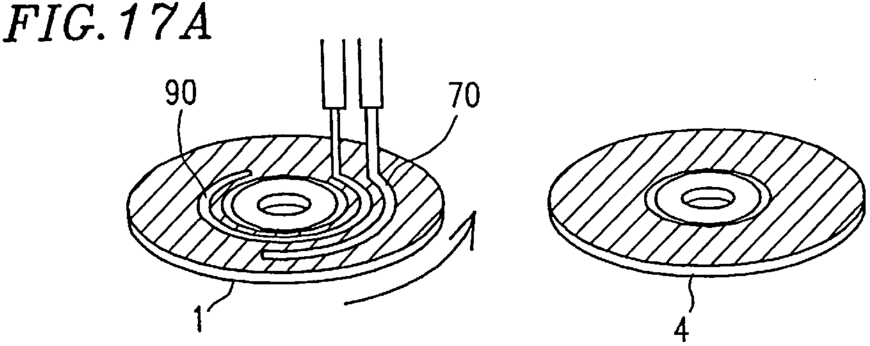
FIGS. 17A to 17D are perspective views showing a fabrication process of the optical disk of Example 6 according to the present invention.
Figure 17B:
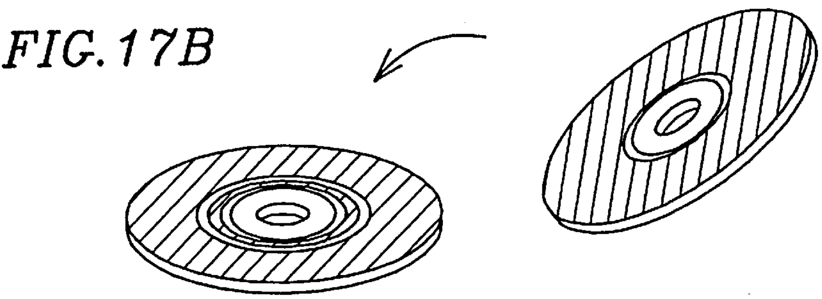

While the first substrate 1 is being rotated at low speed, the radiation curable resin 70 which serves as a major adhesive for the bonding of the substrates is applied to a portion of the first substrate 1 closer to the outer circumference to form a donut-shaped resin layer. At the same time, the radiation curable resin 90 which has a viscosity higher than the radiation curable resin 70 is applied to a portion of the first substrate 1 closer to the inner circumference to form a donut-shaped resin layer (FIG. 17A). The second substrate 4 is then placed on the first substrate 1 with the second information signal surface 5 facing the radiation curable resins 70 and 90 (FIG. 17B).

If the radiation curable resin 90 is not formed as described above, the radiation curable resin 70 will spread in the space between the substrates 1 and 4 when the substrate 4 is placed on the substrate 1, protruding into the center hole of the substrates 1 and 4. When the resin is cured before it spreads to the inner circumferences of the substrates, a sufficient amount of resin is not supplied to the inner circumference portion, resulting in obtaining a disk with low strength.

The radiation curable resin 90 which has high viscosity does not spread so widely and thus does not protrude into the center hole of the substrates 1 and 4. Though the radiation curable resin 70 spreads, it is prevented from protruding into the center hole by being blocked by the radiation curable resin 90.

Figure 17C:
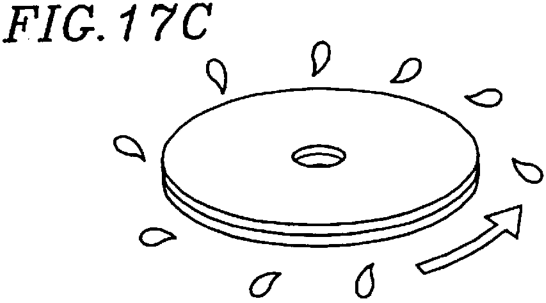
Figure 17D:
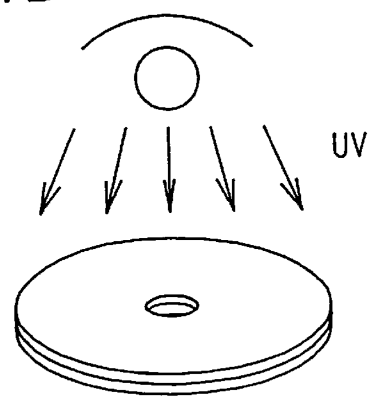

Thereafter, the substrates 1 and 4 are rotated together at high speed so as to allow the radiation curable resin to spread substantially uniformly in the space between the substrates 1 and 4 (FIG. 17C). Radioactive rays are radiated to the radiation curable resins via the second substrate 4 and the second reflection film 6, bonding the two substrates integrally (FIG. 17D).

In general, UV rays are used as the radioactive rays, and a UV curable resin as the radiation curable resin. The metal reflection film including aluminum as a main component allows a small amount of UV rays to transmit therethrough so as to cure the UV curable resin if the thickness of the reflection film is 0.1 $\mu$m or less.

A protection film made of the radiation curable resin can be formed on the reflection film on the first or second substrate, before the process shown in FIGS. 17A to 17D including the application of the radiation curable resin for bonding, the placement of the other substrate on the resin, and the radiation of radioactive rays. Forming the protection film requires an additional step. However, by protecting the reflection film with the protection film, the selection of the radiation curable resin for bonding becomes less restrictive, and the weather resistance of the reflection film can be enhanced.

In Example 6, the radiation curable resin 90 as the sealant layer was formed by spin coating. Instead, the sealant layer 90 can be formed by printing. Printing is easier than spin coating for the application of a radiation curable resin with a viscosity higher than a certain level.

A hot melt adhesive having a viscosity higher than the radiation curable resin 70 can also be used as the sealant layer 90. The hot melt adhesive can be applied by use of a roll coater, for example.

In Example 6, the substrates each having the information signal surface were bonded. Instead, one of the substrates can be a dummy substrate having no information signals recorded thereon.

Also, in the case of a double-layer disk where a semi-transparent film is formed on the information signal surface of the substrate 4, the radiation curable resin can be irradiated with radioactive rays through the semi-transparent substrate 4. Thus, the substrates can be easily bonded together.

Thus, the optical disk of Example 6 has a sealant layer formed on a portion of the substrate closer to the inner circumference. Accordingly, when the radiation curable resin applied to the substrate spreads toward the inner circumference, it will not protrude to the center hole by being blocked by the sealant layer. As a result, troubles such as decentering do not occur when the disk is mounted on a turntable of a player. Further, since a sufficient amount of resin is supplied to the inner circumference of the disk, the bonding strength can be increased.

(Example 7)

An optical information medium of Example 7 will be described.

A radiation curable resin layer formed between substrates of the optical disk of Example 7 contains a weather-resistance pigment. Herein, UV rays are used as the radioactive rays and a UV curable resin is used as the radiation curable resin.

In conventional optical disks, UV curable resin becomes decolorized with time, consequently deteriorating the appearance of the bonded substrates.

By mixing a weather-resistance pigment in the UV curable resin, the decoloration of the UV curable resin becomes less eminent, preventing the appearance of the bonded substrates from being deteriorated with time.

The optical disk of Example 7 using the radiation curable resin having a weather-resistance pigment mixed therein is fabricated as follows.

A UV curable resin in which a weather-resistance pigment is mixed uniformly is prepared. Using this resin as the radiation curable resin 7, the conventional process shown in FIGS. 2A to 2D is followed.

In Example 7, the substrates each having the information signal surface were bonded. Instead, one of the substrates can be a dummy substrate having no information signals recorded thereon.

The fabrication method of this example can also be applied to the fabrication of optical disks of other examples according to the present invention.

(Example 8)

An optical information medium of Example 8 will be described with reference to FIG. 18.

In the optical disk of Example 8, a radiation curable resin of which color density varies with the level of the curing thereof is used as the resin for bonding substrates. Herein, a UV curable resin is used as the radiation curable resin and UV rays are radiated to the resin.

Conventionally, there is no way to determine the degree of the curing of the UV curable resin, except for breaking the bonded substrates and conduct a destructive test, directly measuring the hardness of the UV curable resin. Thus, 100% inspection is not possible, and it is difficult to obtain a uniform degree of curing for all disks fabricated.

According to the optical disk of Example 8 having a radiation curable resin of which color density varies with the degree of curing, the degree of the curing of the radiation curable resin can be determined by the color density of the resin in a non-destructive manner. Thus, a uniform degree of curing for all disks fabricated can be obtained by terminating the curing of the resin when the resin obtains a predetermined color density.

As the UV curable resin with a color density varying with the degree of curing, SD-1700 manufactured by Dainippon Ink & Chemicals, Inc., for example, can be used.

A method for fabricating the optical disk of Example 8 will be described.

A UV curable resin having a color density varying with the degree of curing is prepared. Using this resin as the radiation curable resin 7, a process similar to the conventional process shown in FIGS. 2A to 2D is followed. That is, the UV curable resin is applied to the first substrate 1. The second substrate 4 is placed on the first substrate 1 with the second reflection film 6 facing the UV curable resin. The substrates 1 and 4 are rotated together with high speed so as to allow the UV curable resin to spread in the space between the substrates 1 and 4.

Figure 2A:
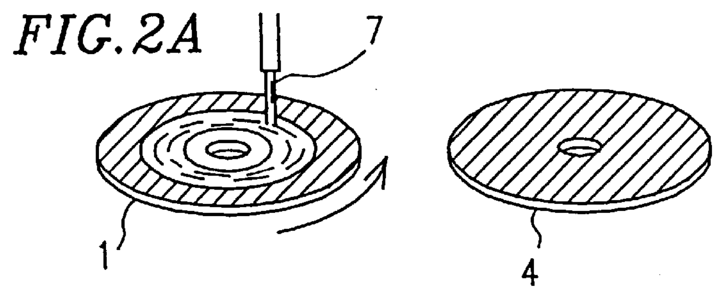
FIGS. 2A to 2D are perspective views showing a conventional fabrication process of the optical disk of FIG. 1.
Figure 2B:
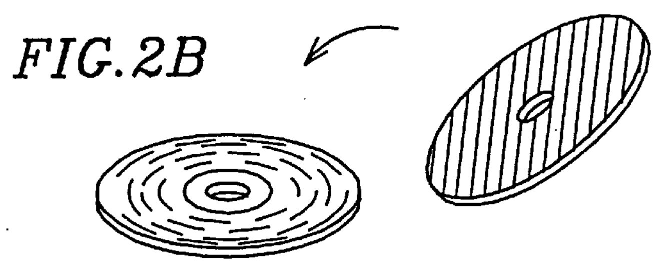
Figure 2C:
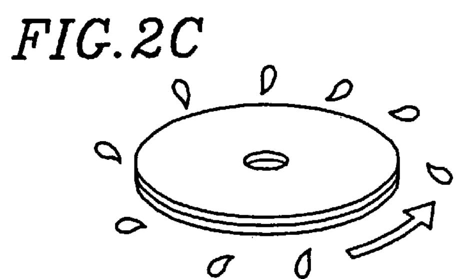
Figure 2D:
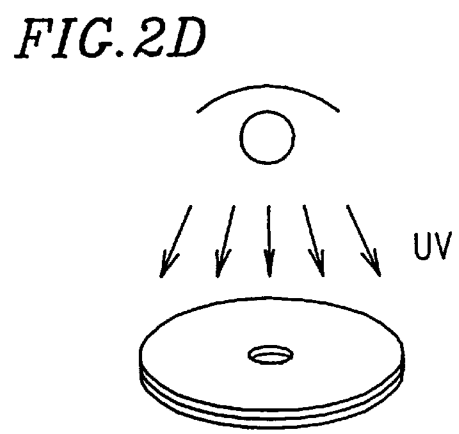
Figure 18:
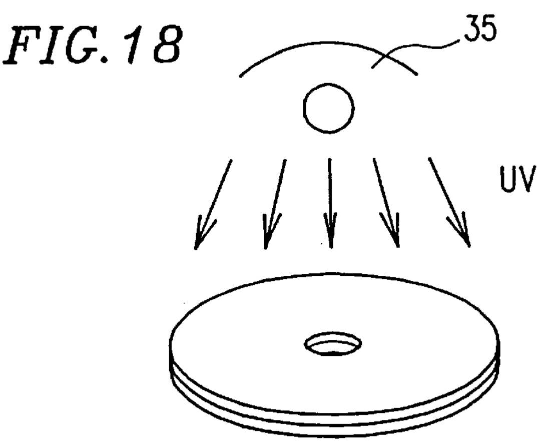
FIG. 18 is a perspective view showing a step for fabricating an optical disk of Example 8 according to the present invention.
Figure 18:
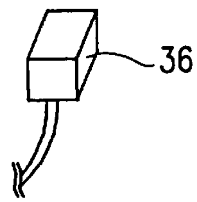

In Example 8, an apparatus including a UV source 35 and a sensor 36 for detecting the color density of the UV curable resin as shown in FIG. 18 is used at the curing of the UV curable resin, instead of the conventional step shown in FIG. 2D.

When the UV curable resin is irradiated with UV rays from the UV source 35 through the substrate 4, the color density of the UV curable resin is detected with the sensor 36. The radiation of UV rays is discontinued immediately after the color density of the UV curable resin reaches a predetermined color density corresponding to the complete curing of the UV curable resin which has been previously determined. Thus, it is ensured that the UV curable resin has been completely cured. A color-difference meter, for example, can be used as the sensor 36.

Thus, this example makes it possible to confirm the complete curing of the UV curable resin without conducting a destructive test, conduct 100% inspection of products, and obtain a uniform degree of curing for all disks fabricated.

In Example 8, the substrates each having the information signal surface were bonded. Instead, one of the bonded substrates can be a dummy substrate having no information signals recorded thereon.

(Example 9)

A method for fabricating an optical information medium of Example 9 will be described with reference to FIG. 19. Herein, a UV curable resin is used as the radiation curable resin and UV rays are used to irradiate the resin.

Curing of the UV curable resin starts from the portion closest to a light source. Accordingly, the outer circumferences of bonded substrates tend to warp toward a light source.

In the method of Example 9, a process similar to the conventional process shown in FIGS. 2A to 2D is followed. That is, the UV curable resin is applied to the first substrate 1. The second substrate 4 is placed on the first substrate 1 with the second reflection film 6 facing the UV curable resin. The substrates 1 and 4 are rotated together with high speed so as to allow the UV curable resin to spread in the space between the substrates 1 and 4.

Figure 19:
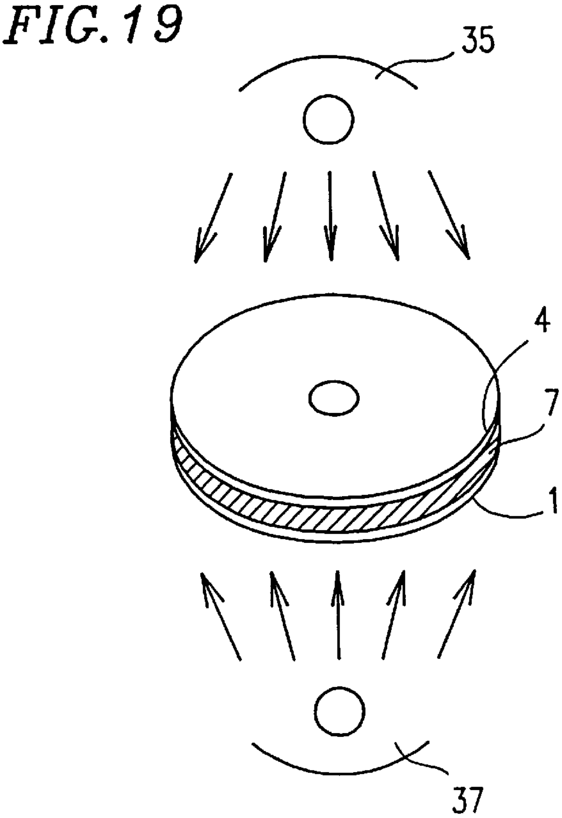
FIG. 19 is a perspective view showing a step for fabricating an optical disk of Example 9 according to the present invention.

In Example 9, an apparatus including two UV sources 35 and 37 as shown in FIG. 19 is used at the curing of the UV curable resin, instead of the conventional step shown in FIG. 2D. The UV source 35 emits UV rays to irradiate the UV curable resin 7 through the substrate 4 and cure the resin from the side of the substrate 4, while the UV source 37 emits UV rays to irradiate the UV curable resin 7 through the substrate 1 and cure the resin from the side of the substrate 1.

At the curing of the UV curable resin 7, the UV curable sources 35 and 37 are operated alternately each for a predetermined time period or simultaneously. Thus, the UV curable resin 7 is substantially uniformly cured and contracted from both sides of the substrates 1 and 4, preventing the substrates 1 and 4 from warping due to non-uniform curing and contraction of the UV curable resin 7.

As a result, an optical disk having the first and second substrates 1 and 4 bonded integrally with reduced warping can be obtained.

In the case where the substrates 1 and 4 have different UV transmittances, the intensity or duration of the UV radiation by the UV sources 35 and 37 can be adjusted to supply different amounts of light to the UV curable resin 7 between from the side of the substrate 1 and from the side of the substrate 4 and thus to obtain the same effect as that described above.

The same effect can also be obtained by using only the UV source 35 and turning over the substrates 1 and 4 with the UV curable resin 7 therebetween or moving the UV source 35 to the opposite position where the UV source 37 is otherwise located.

A dummy substrate having neither an information signal surface nor a reflection film can be used in place of the substrate 1 or 4 to obtain the same effect as described above.

Thus, according to the present invention, an optical disk having thin substrates bonded together where no protrusion of resin into the center holes of the substrates is observed and good appearance is maintained is provided. A method and an apparatus for fabricating such an optical disk can also be provided.

According to an optical disk of the present invention, a stopper is provided for preventing a radiation curable resin from protruding into the center holes of the substrates. Also, at least a half of the clamp region of the optical disk is supplied with the resin. Thus, the resin is prevented from protruding into the center holes of the substrates, and the clamp region has high strength, providing stable clamping of the disk.

According to another optical disk of the present invention, a sealant layer is formed near the inner circumference of the substrate. Thus, the radiation curable resin spreading toward the center hole is prevented from protruding into the center hole. As a result, troubles such as decentering at mounting the optical disk on a turntable of a player can be avoided.

The radiation curable resin before curing can be absorbed through suction ports disposed at the center hole of the substrates, so as to suppress the movement of the resin to the outer circumferences of the substrates and remove resin protruding into the center hole. Any resin protruding from the outer circumferences of the substrates is prevented from attaching to a rotational table for rotating the substrates by making the outer diameter of the rotational table smaller than that of the substrates. Protruding resin may be removed by a jig and the like before being cured. Thus, an optical disk with reduced decentering is obtained.

A weather-resistance pigment can be mixed in the radiation curable resin. This makes decoloration of the radiation curable resin less visible and prevents the good appearance of the bonded substrates from deteriorating with time.

A radiation curable resin of which color density varies with the degree of the curing thereof can be used. This makes it possible to measure the degree of the curing of the radiation curable resin interposed between the bonded substrates in a non-destructive manner. Thus, the degree of curing can be made uniform for all optical disks by discontinuing the curing of the resin when a predetermined color density is obtained.

In order to irradiate and cure the radiation curable resin from both sides, the first and second substrates are simultaneously or alternately for at least one time each, irradiated from both sides with radioactive rays. This prevents the bonded substrates from warping due to the contraction of the radiation curable resin.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for fabricating an optical information medium, comprising:

means for applying a radiation curable resin to a first substrate, while the first substrate is being rotated, the first substrate having formed therein a stopper for preventing the radiation curable resin from protruding into a center hole, wherein the resin is applied to a portion of the first substrate circumferentially outwardly disposed on the first substrate with respect to the stopper, to form a donut-shaped resin layer;

means for placing a second substrate on the first substrate;

means for rotating the first and second substrates integrally; and means for irradiating the radiation curable resin with radioactive rays passing through at least one of the first and second substrates.

2. An apparatus according to claim 1, further comprising means for placing a transparent plate on the bonded substrates.

3. An apparatus according to claim 1, further comprising means for applying another radiation curable resin to a portion of the substrate closer to an inner circumference of the substrate with respect to the stopper.

4. An apparatus according to claim 3, wherein the means for applying another radiation curable resin includes any of brush means, roller means, and clean printing means.

5. An apparatus according to claim 1, further comprising means for irradiating the outer circumferences of the substrate placed on each other with the radioactive rays.

6. An apparatus for fabricating an optical information medium by bonding a first substrate having a center hole and a second substrate having a center hole with a radiation curable resin interposed therebetween, comprising:

means for applying a first radiation curable resin on a portion of the first substrate closer to an inner circumference of the first substrate and applying a second radiation curable resin having a viscosity lower than the first radiation curable resin to a portion of the first substrate closer to an outer circumference of the first substrate while the first substrate is being rotated;

means for placing the second substrate on the first substrate;

means for rotating the first and second substrates integrally; and means for irradiating the radiation curable resins with radioactive rays passing through at least one of the first and second substrates.

7. An apparatus for fabricating an optical information medium by bonding a first substrate having a center hole and a second substrate having a center hole with a radiation curable resin interposed therebetween, comprising:

means for applying a portion of the radiation curable resin on a portion of the first or second substrate closer to an inner circumference of the first or second substrate;

means for applying the remainder of the radiation curable resin on a portion of the first substrate closer to an outer circumference of the first substrate while the first substrate is being rotated;

means for placing the second substrate on the first substrate;

means for rotating the first and second substrates integrally; and means for irradiating the radiation curable resin with radioactive rays passing through at least one of the first and second substrates.

8. An apparatus for fabricating an optical information medium by bonding together a first substrate having a center hole and a second substrate having a center hole with a radiation curable resin interposed therebetween, comprising:

means for applying a hot melt adhesive to a portion of the first or second substrate closer to an inner circumference of the first or second substrate;

means for applying the radiation curable resin to a portion of the first substrate closer to an outer circumference of the first substrate while the first substrate is being rotated;

means for placing the second substrate on the first substrate;

means for rotating the first and second substrates integrally; and means for irradiating the radiation curable resin with radioactive rays passing through at least one of the first and second substrates.

* * * * *